(12) United States Patent
Douglas et al.

(10) Patent No.: US 11,014,767 B2
(45) Date of Patent: May 25, 2021

(54) REJECTION MECHANISM FOR A CONVEYOR SYSTEM

(71) Applicant: Material Handling Systems, Inc., Mt. Washington, KY (US)

(72) Inventors: Josiah Douglas, Louisville, KY (US); Bradford James Hood, Mt. Washington, KY (US); Paul Receveur, New Albany, IN (US); Kurt Michael Wittmer, Louisville, KY (US)

(73) Assignee: Material Handling Systems, Inc., Mt. Washington, KY (US)

( * ) Notice: Subject to any disclaimer, the term of this patent is extended or adjusted under 35 U.S.C. 154(b) by 0 days.

(21) Appl. No.: 16/887,286

(22) Filed: May 29, 2020

(65) Prior Publication Data

US 2020/0377309 A1 Dec. 3, 2020

Related U.S. Application Data

(60) Provisional application No. 62/854,434, filed on May 30, 2019, provisional application No. 62/863,348, filed on Jun. 19, 2019.

(51) Int. Cl.
*B65G 25/08* (2006.01)
*B65G 47/82* (2006.01)
*B65G 47/44* (2006.01)

(52) U.S. Cl.
CPC .............. *B65G 47/82* (2013.01); *B65G 47/44* (2013.01); *B65G 2201/0285* (2013.01)

(58) Field of Classification Search
CPC ........ B65G 25/08; B65G 25/12; B65G 47/46; B65G 47/82; B65G 2201/0285

USPC ................... 198/370.07, 597, 717, 747, 890; 209/916; 700/230
See application file for complete search history.

(56) References Cited

U.S. PATENT DOCUMENTS

| | | | |
|---|---|---|---|
| 4,103,789 A * | 8/1978 | Andrews ............... | B65G 67/04 198/602 |
| 4,732,260 A | 3/1988 | Canziani | |
| 5,868,239 A | 2/1999 | Bonnet | |
| 5,894,918 A * | 4/1999 | Bonnet ............... | B65G 47/844 198/370.04 |

(Continued)

OTHER PUBLICATIONS

Korean Intellectual Property Office, International Search Report and Written Opinion issued in corresponding Application No. PCT/US2020/035201, dated Sep. 15, 2020.

*Primary Examiner* — Joseph A Dillon, Jr.
(74) *Attorney, Agent, or Firm* — Stites & Harbison, PLLC; David W. Nagle, Jr.; Gary N. Stewart

(57) ABSTRACT

A rejection mechanism for a conveyor system, which pushes parcels across a surface, includes a linear actuator and a paddle mounted to the linear actuator for movement between a first position and a second position. The paddle includes a bracket portion, an upright portion, and a lateral wall portion. The lateral wall portion is configured to push parcels across a surface positioned below the lateral wall portion as the paddle is moved from the first position to the second position. In some embodiments, the rejection mechanism can further include a way cover which expands and contracts with movement of the paddle. In some embodiments, the lateral wall portion can be configured to rotate about an axis of rotation defined by a hinge to transition between an engaged and a disengaged position.

12 Claims, 16 Drawing Sheets

(56) References Cited

U.S. PATENT DOCUMENTS

| | | | |
|---|---|---|---|
| 5,950,798 A | 9/1999 | Bonnet | |
| 6,318,539 B1 * | 11/2001 | Bonnet | B65G 47/82 198/370.02 |
| 6,446,782 B1 * | 9/2002 | Patrick | B65G 47/71 198/370.06 |
| 6,474,924 B2 * | 11/2002 | Fallin | B65G 1/0421 414/277 |
| 6,516,937 B1 * | 2/2003 | Deer | B65G 43/00 198/370.07 |
| 8,151,969 B2 | 4/2012 | Hoene | |
| 9,950,878 B2 * | 4/2018 | Heston | B65G 57/26 |
| 10,604,361 B2 * | 3/2020 | Heston | B65G 47/082 |
| 10,646,898 B2 | 5/2020 | Hillerich, Jr. et al. | |
| 2003/0155213 A1 * | 8/2003 | Tatar | B07C 5/362 198/717 |
| 2010/0293891 A1 * | 11/2010 | Lamamy | B65B 43/285 53/167 |
| 2011/0192116 A1 * | 8/2011 | Bachelle | B65B 11/10 53/381.1 |
| 2018/0072514 A1 * | 3/2018 | Heston | B65G 47/82 |
| 2018/0148272 A1 | 5/2018 | Wagner et al. | |
| 2019/0225433 A1 * | 7/2019 | Ooba | B65G 47/82 |
| 2020/0377308 A1 * | 12/2020 | Wagner | G05B 19/4189 |

\* cited by examiner

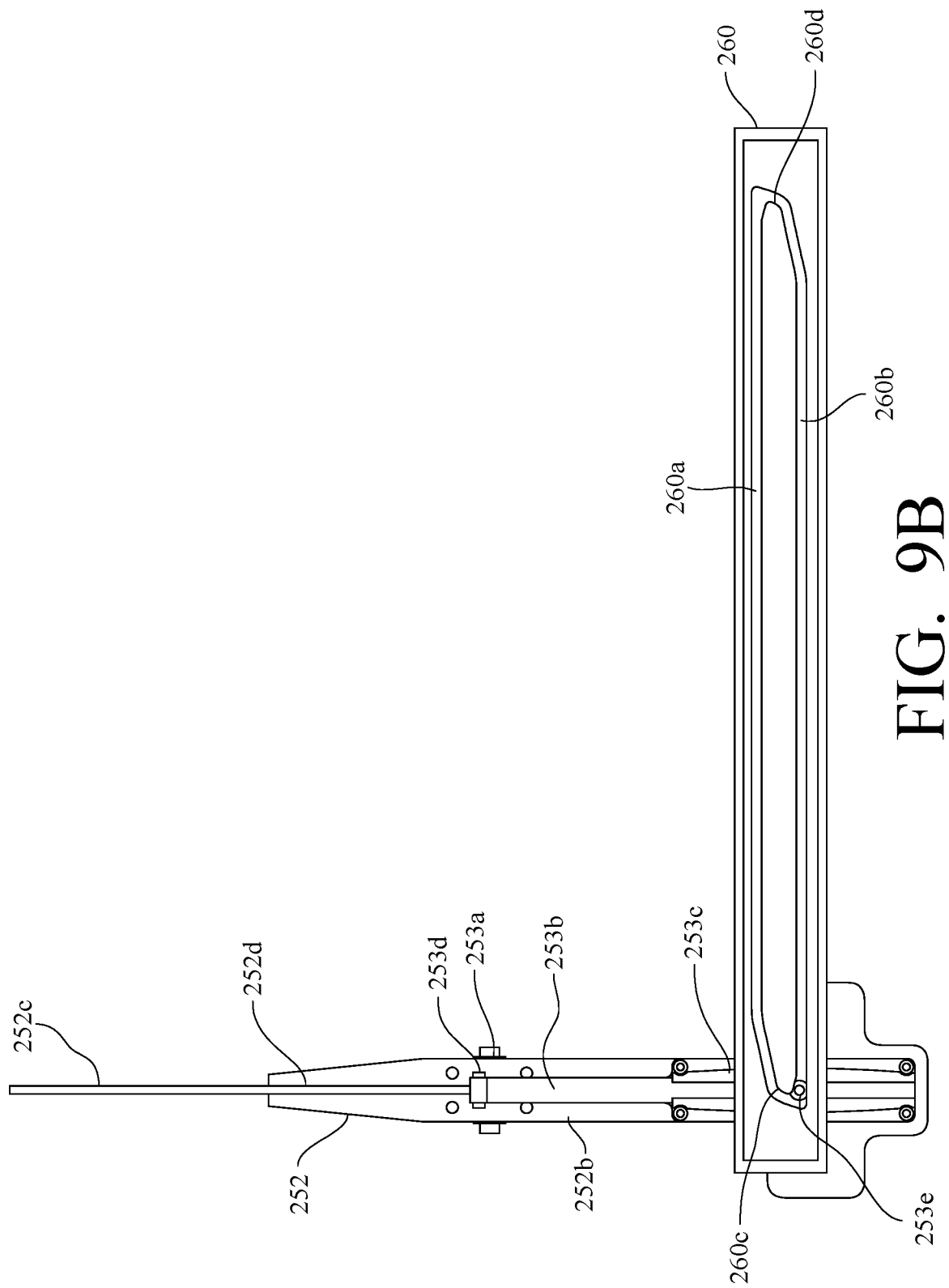

REJECTION MECHANISM FOR A CONVEYOR SYSTEM

CROSS-REFERENCE TO RELATED APPLICATIONS

The present application claims priority to: U.S. Patent Application Ser. No. 62/854,434 filed on May 30, 2019; and U.S. Patent Application Ser. No. 62/863,348 filed on Jun. 19, 2019. The entire disclosures of each of these priority applications are incorporated herein by reference.

BACKGROUND OF THE INVENTION

The present invention relates to the handling of parcels within a sorting or similar facility.

In a sorting facility for parcels, various parcels are unloaded from trucks or other vehicles at unloading locations, sorted, and then loaded onto trucks or other vehicles at loading locations for delivery to the intended recipients. Thus, within the sorting facility, there is often a complex system of conveyors and equipment that facilitates transport and sorting of the various parcels within the facility.

When first introduced into the system of conveyors and equipment, the parcels are randomly positioned on a conveyor in a "bulk flow." Thus, within the sorting facility, the first step is often to transform the bulk flow into a singulated flow of parcels in which the parcels are positioned at substantially equal intervals and aligned (i.e., in a single file line) along a conveyor for subsequent processing. A wide variety of singulators exist in the art, many of which employ various combinations of belt conveyors and/or roller conveyors to achieve the desired singulation of the parcels. However, there are certain deficiencies in such prior art systems. For example, a surge in the volume of parcels may overwhelm the mechanical systems, and parcels may not be fully singulated. Non-singulated parcels may then interfere with subsequent processing, including downstream sorting.

U.S. Pat. No. 10,646,898, which is incorporated herein by reference, thus describes a system and method for identifying and transferring parcels from a bulk flow on the first conveyor (or "pick conveyor") to a singulated stream of parcels on the second conveyor (or "place conveyor"). Specifically, a robot singulator (or robot) receives parcels via the first conveyor, engages each parcel, and then places it onto the second conveyor. The robot singulator thus includes an end effector with a means for engaging the selected parcel. For example, the end effector may include one or more vacuum cups for engaging the selected parcel. The end effector is mounted on a framework, which is controlled to move and position the end effector. To position the framework and the end effector to engage the selected parcel, the system also includes a vision and control subsystem associated with the robot. The vision and control subsystem includes one or more cameras that are operably connected to a computer for receiving and processing image data. Specifically, the one or more cameras are used to generate a three-dimensional representation of the parcels. Parcels are identified in the three-dimensional representation, and the computer then communicates instructions to position the robot such that the end effector can engage and manipulate each parcel.

However, in some cases, certain parcels may exceed size and/or weight limitations or otherwise may be characterized as "unconveyable." In other cases, the vision and control subsystem may not be able to accurately identify a parcel because of a "hidden" edge or other anomaly that makes it difficult to identify the parcel. Thus, there is a need for a rejection mechanism to handle those parcels that cannot be readily transferred from the first conveyor to the second conveyor. Furthermore, in handling those parcels, it is important that the rejection mechanism not inadvertently "trap" parcels.

SUMMARY OF THE INVENTION

The present invention is a rejection mechanism for a conveyor system, which pushes parcels across a surface, such as an upper surface of a conveyor.

A rejection mechanism for a conveyor system generally includes a linear actuator and a paddle mounted to the linear actuator for movement between a first position and a second position. The paddle includes a lower bracket portion for mounting the paddle to the linear actuator, an upright portion that extends upward from the bracket portion, and a lateral wall portion that extends from the upright portion. In use, the lateral wall portion of the paddle maintains a substantially horizontal orientation relative to the upright portion of the paddle as the paddle is moved from the first position to the second position. The rejection mechanism can thus be mounted relative to a target surface (or "rejection zone") of a conveyor, such that, as the linear actuator is actuated to move the paddle from the first position to the second position, the lateral wall portion of the paddle moves across the rejection zone. Parcels located in the rejection zone are thus pushed across the rejection zone and off of the conveyor by the lateral wall portion as the paddle is moved from the first position to the second position.

In some embodiments, the rejection mechanism further includes a way cover having a first end fixed in position and a second end that is mounted to the lateral wall portion of the paddle. The way cover expands and contracts with movement of the paddle, such that the way cover provides a trailing wall that fills in the space behind the lateral wall portion as the paddle moves from the first position to the second position. The way cover thus prevents parcels from falling behind the lateral wall portion of the paddle as the paddle is moved between the first position and the second position. In some embodiments, the paddle further includes a brush mounted to the lateral wall portion of the paddle, which fills in any gap existing between the lateral wall portion of the paddle and an underlying surface, such as an upper surface of a conveyor, thereby ensuring smaller or flatter parcels are engaged by the paddle as it is moved from the first position to the second position.

In some embodiments, the lateral wall portion of the paddle is configured to transition between an engaged position and a disengaged position. In the engaged position, the lateral wall portion of the paddle is in a substantially horizontal orientation for engaging parcels in the rejection zone as the paddle is moved from the first position to the second position. In the disengaged position, the lateral wall portion is in a substantially vertical orientation, such that the paddle is able to move from the second position to the first position without moving over the rejection zone and engaging any parcels positioned thereon, thereby ensuring no parcels become trapped behind the lateral wall portion of the paddle.

In some embodiments, the upright portion of the paddle includes an upper section and a lower section connected by a hinge. The hinge defines an axis of rotation about which the lateral wall portion of the paddle can rotate to move between the engaged position and the disengaged position. To rotate the lateral wall portion from the disengaged position, the rejection mechanism further includes a first pushing mechanism, such as a linear actuator. Similarly, to rotate the lateral wall portion from the engaged position the disengaged position, the rejection mechanism further includes a second pushing mechanism, such as a linear actuator.

In some embodiments, the lateral wall portion of the paddle is operably connected to the upright portion of the paddle by a hinge. The hinge defines an axis of rotation about which the lateral wall portion of the paddle can rotate between the engaged position and the disengaged position. In such embodiments, the first rejection mechanism further includes a first linkage that is operably connected the lateral wall portion of the paddle and mounted for sliding movement in a channel defined by a guide that is mounted to a surface of the upright portion of the paddle. A cam follower is mounted to and extends from the first linkage and is received within a track along which the cam follower moves as the linear actuator moves the paddle between the first position and the second position. In some embodiments, the track may be defined by, and thus be characterized as including: an upper track portion; a lower track portion; a first inclined ramp interconnecting the upper track portion and the lower track portion; and a second inclined ramp that also interconnects the upper track portion and the lower track portion. In some embodiments, the track is designed such that as the cam follower moves along the first inclined ramp, the lateral portion of the paddle is transitioned from the engaged position to the disengaged position, and, as the cam follower moves along the second inclined ramp, the lateral wall portion of the paddle is transitioned from the disengaged position to the engaged position.

The rejection mechanism of the present invention can be combined with a conveyor for conveying a flow of parcels to provide an improved conveyor system for processing and sorting parcels. In some embodiments, the conveyor system can further include a rejection chute, a robot singulator, an additional conveyor, and/or a control subsystem which regulates certain operations of one or more components of the conveyor system.

DESCRIPTION OF THE DRAWINGS

FIG. 9B is a side view similar to FIG. 9A, but with the paddle of the exemplary rejection mechanism of FIG. 8 at a second position along the track;

DETAILED DESCRIPTION OF THE INVENTION

The present invention is a rejection mechanism for a conveyor system, which pushes parcels across a surface, such as an upper surface of a conveyor.

Figure 1A:
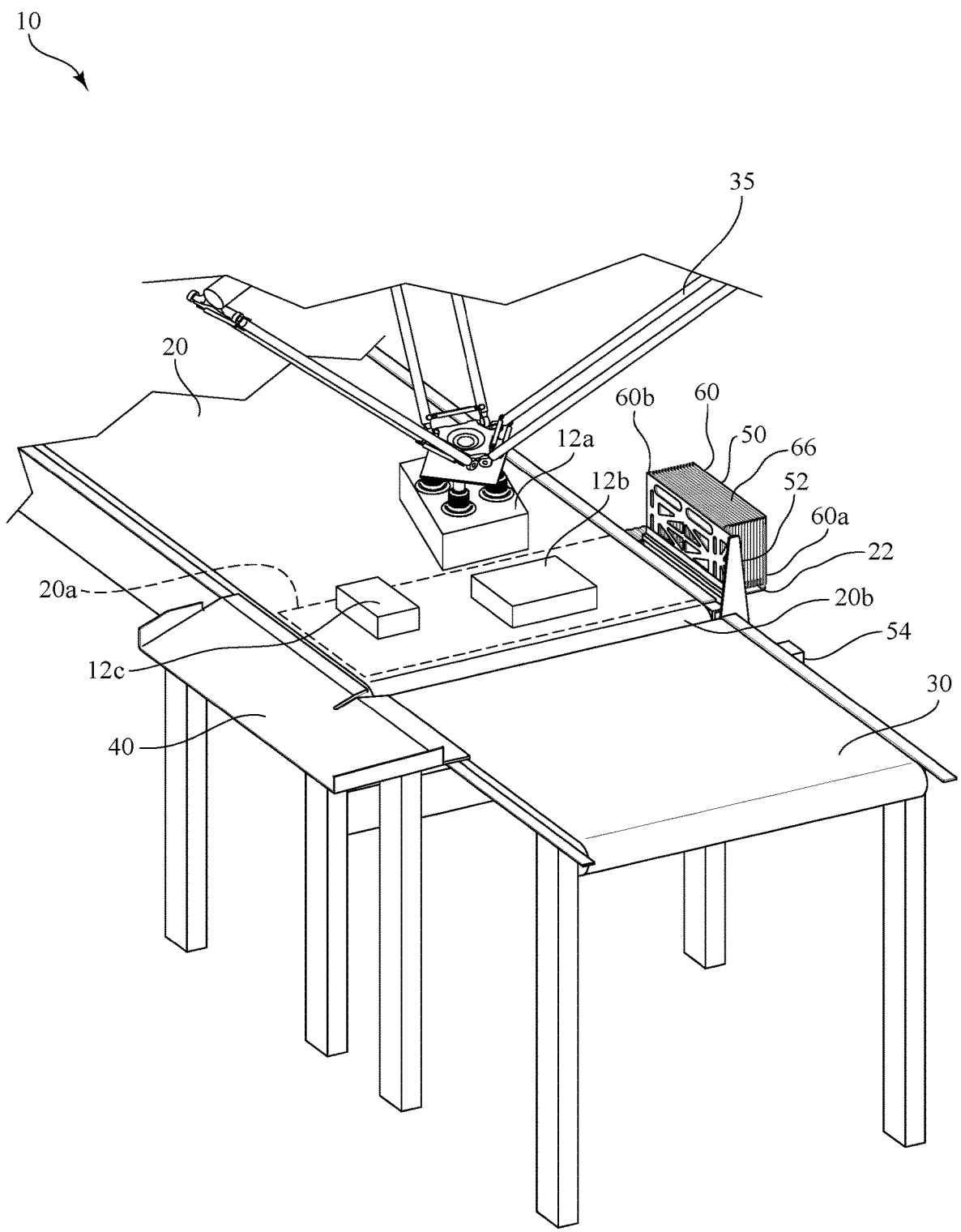
FIG. 1A is a perspective view of a conveyor system including an exemplary rejection mechanism made in accordance with the present invention, with the paddle of the exemplary rejection mechanism in a first position.
Figure 1B:
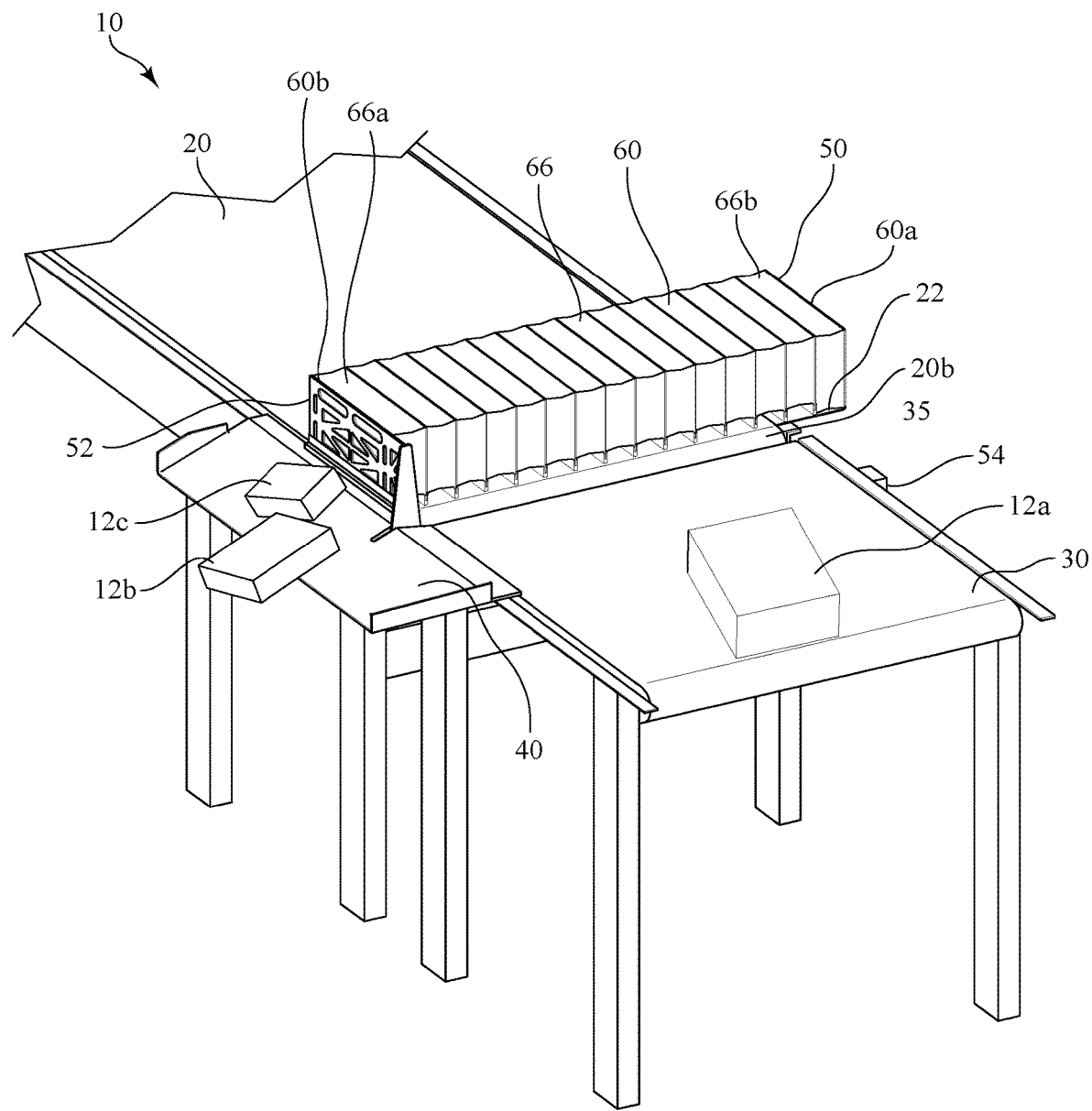
FIG. 1B is a perspective view similar to FIG. 1A, but with the paddle of the exemplary rejection mechanism in a second position.

FIGS. 1A and 1B are perspective views of a conveyor system 10 for conveying and transferring parcels 12a, 12b, 12c, which includes an exemplary rejection mechanism 50 made in accordance with the present invention. As shown in FIGS. 1A and 1B, the conveyor system 10 further includes a first conveyor (or "pick conveyor") 20, a second conveyor (or "place conveyor') 30 downstream of the first conveyor 20, and a robot singulator (or robot) 35 for transferring parcels from the first conveyor 20 to the second conveyor 30. (For sake of clarity, only a portion of the robot is shown in FIG. 1A, and it is not shown at all in FIG. 1B). Parcels 12b, 12c which cannot be readily transferred by the robot singulator 35 end up in a rejection zone 20a (indicated in dashed lines in FIG. 1A) near a leading edge 20b of the first conveyor 20. The rejection zone 20a corresponds with a portion of an upper surface of the first conveyor 20, which is in the path of a paddle 52 of the rejection mechanism 50, as further described below. Of course, parcels can also be accessed and engaged by the robot singulator 35 in the rejection zone 20a; in other words, parcels are not exclusively engaged by the rejection mechanism 50 in this area, as should become clear in the discussion that follows.

As evidenced by viewing FIGS. 1A and 1B in sequence, and as further described below, the rejection mechanism 50 is selectively activated to push parcels 12b, 12c located in the rejection zone 20a off of the first conveyor 20 and onto a rejection chute 40 positioned to the side of the first conveyor 20 for subsequent sorting or recirculation back to the first conveyor 20. Following discharge of the parcels 12b, 12c onto the rejection chute 40, the rejection mechanism 50 is returned to its home position, and the first conveyor 20 is indexed forward to facilitate subsequent sorting of any remaining parcels located on the first conveyor 20. As further described below with reference to FIG. 11, operation of the first conveyor 20, second conveyor 30, and/or the robot singulator 35 are, in at least some embodiments, regulated by a control subsystem 300.

Figure 2:
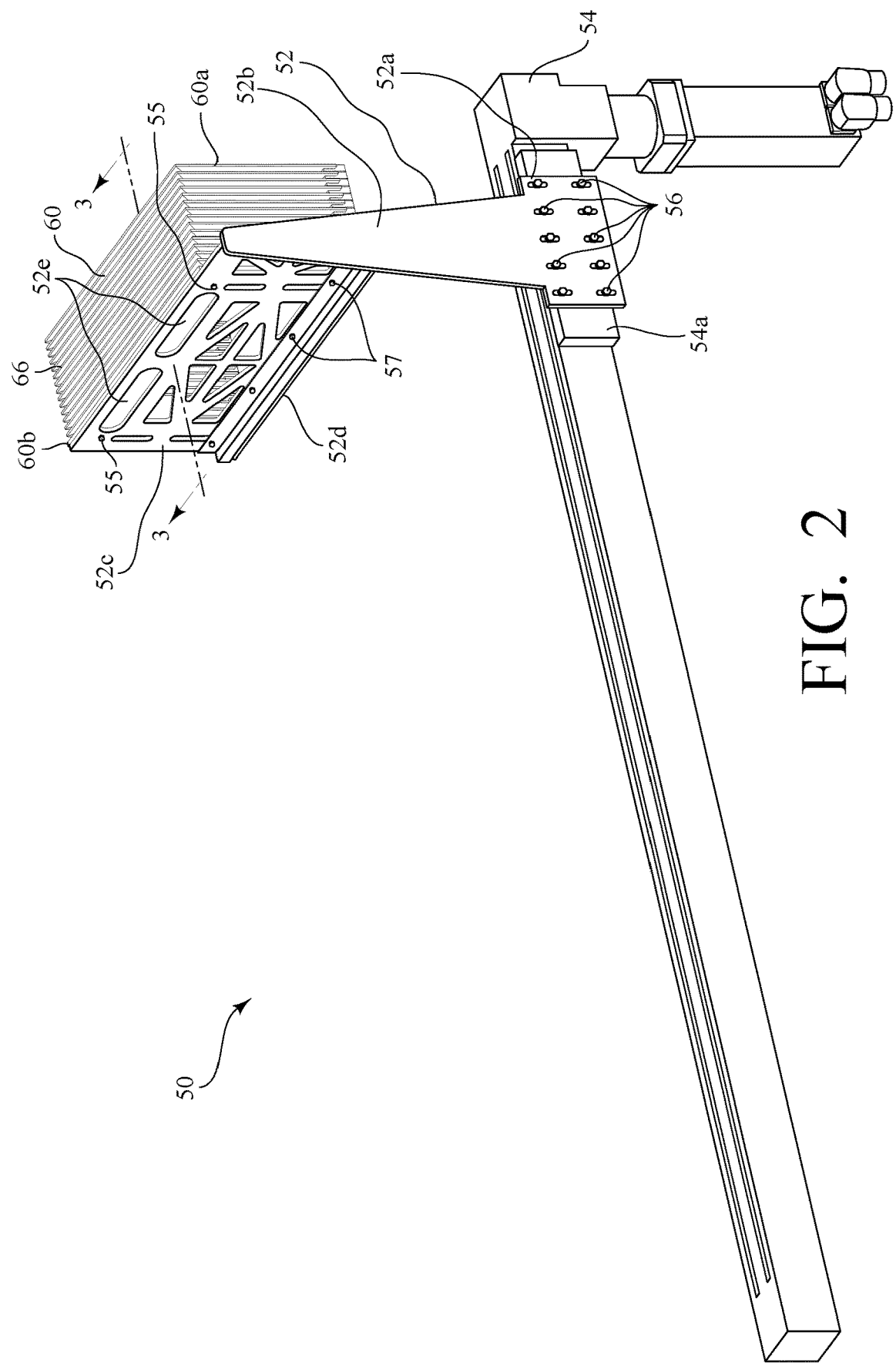
FIG. 2 is a perspective view of the exemplary rejection mechanism of FIG. 1A.

FIG. 2 is a perspective view of the exemplary rejection mechanism 50, in isolation from the other components of the conveyor system 10 shown in FIGS. 1A and 1B.

Figure 3:
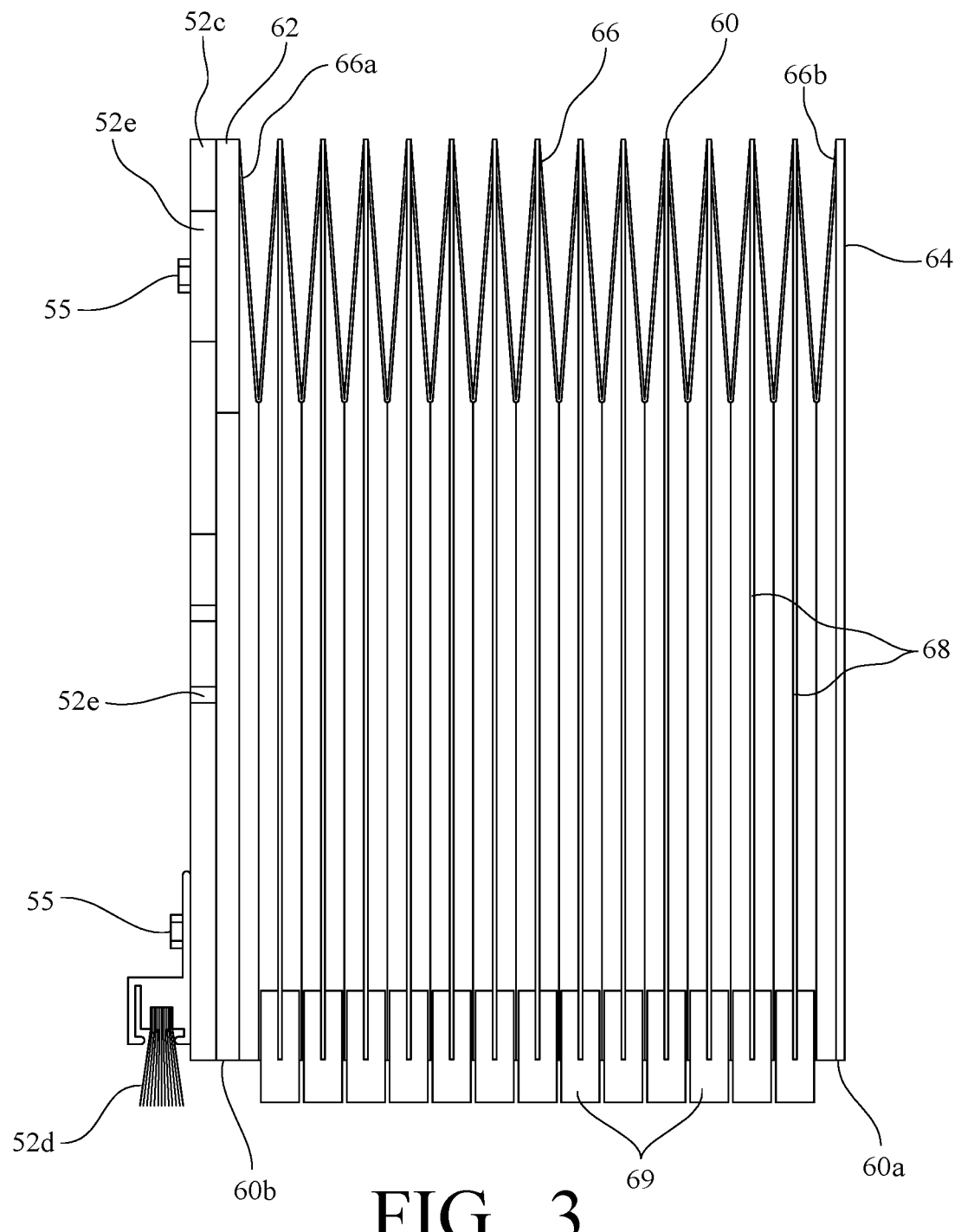
FIG. 3 is a sectional view of the paddle of the exemplary rejection mechanism of FIG. 2 taken along line 3-3 of FIG. 2.

FIG. 3 is a sectional view of the paddle of the exemplary rejection mechanism of FIG. 2 taken along line 3-3 of FIG. 2.

Referring now to FIGS. 1A, 1B, and 2, in this exemplary embodiment, the rejection mechanism 50 includes a paddle 52 that is mounted on a linear actuator 54, such that the paddle 52 can be moved between a first (or home) position, as shown in FIG. 1A, and a second position, as shown in FIG. 1B, via the linear actuator 54. In this exemplary embodiment, the linear actuator 54 is a motor-controlled actuator, with a carriage 54a that moves between the first position and the second position. Many suitable linear actuators are commercially available. For example, one suitable linear actuator for this purpose is manufactured and distributed by Schneider Electric USA of Andover, Mass., Model. No. PAS42BB. Of course, this is only one example of a suitable actuator, and many other forms of pneumatic or motor-controlled actuators could be incorporated into the rejection mechanism 50 and still enable the rejection mechanism 50 to operate as intended and described herein. For example, in alternative embodiments, the linear actuator 54 may be a rod-less pneumatic actuator, such as that manufactured and distributed by Festo Corporation of Hauppauge, N.Y., Model No. DGC-32-1200-KF-YSRW-A ZUB-F-M. As further described below with reference to FIG. 11, in some embodiments, operation of the linear actuator 54 (i.e., movement of the carriage 54a) may be regulated, at least in part, by a control subsystem 300.

Referring now specifically to FIG. 2, in this exemplary embodiment, the paddle 52 has a unitary construction, but can be characterized as including: a lower bracket portion 52a; an upright portion 52b that extends from the lower bracket portion 52a; and a lateral wall portion 52c that extends from the upright portion 52b. Specifically, in this exemplary embodiment, the lateral wall portion 52c extends horizontally from the upright portion 52b and is in a perpendicular orientation relative to the upright portion 52b of the paddle 52. The lower bracket portion 52a is mounted to the carriage 54a of the linear actuator 54 by one or more fasteners 56, such as bolts or similar conventional fasteners.

Referring now again to FIGS. 1A and 1B, the rejection mechanism 50 is positioned relative to the first conveyor 20, such that, as the paddle 52 moves from the first position to the second position, the paddle 52 moves across the rejection zone 20a toward the rejection chute 40. The movement of the lateral wall portion 52c of the paddle 52 across the rejection zone 20a thus pushes any parcels 12b, 12c located in the rejection zone 20a off of the first conveyor 20 and onto the rejection chute 40. The linear actuator 54 of the rejection mechanism 50 can thus be selectively activated to discharge parcels 12b, 12c from the first conveyor 20.

Although only a portion of the linear actuator 54 is visible in FIGS. 1A and 1B, as a result of the positioning of the second conveyor 30, the linear actuator 54, in this embodiment, is mounted below the leading edge 20b of the first conveyor 20, such that the upright portion 52b of the paddle 52 extends upward and adjacent to the leading edge 20b of the first conveyor 20, and the lateral wall portion 52c of the paddle 52 is thus positioned over the upper surface of the first conveyor 20. In the conveyor system 10 shown in FIGS. 1A and 1B, the second conveyor 30 is positioned downstream of and adjacent to the first conveyor 20, such that the upright portion 52b of the paddle 52 extends upward through a gap between the first conveyor 20 and the second conveyor 30. Of course, in other embodiments, the linear actuator 54 may alternatively be mounted to the second conveyor 30 and still enable the exemplary rejection mechanism 50 to function in the manner described herein.

Referring now to FIGS. 1A, 1B, and 2-3, to prevent parcels 12a, 12b, 12c from passing under the lateral wall portion 52c of the paddle 52 as the paddle 52 moves from the first position (FIG. 1A) and across the rejection zone 20a of the first conveyor 20 to the second position (FIG. 1B), it is generally preferred that there is a minimal vertical gap between the bottom edge of the lateral wall portion 52c of the paddle 52 and the upper surface of the first conveyor 20. For example, in some embodiments, this vertical gap may be approximately 10 mm. Furthermore, in this exemplary embodiment, the paddle 52 includes a brush 52d mounted to the front face of the lateral wall portion 52c, such that the bristles of the brush 52d extend below the bottom edge of the lateral wall portion 52c to engage the upper surface of the first conveyor 20. In this regard, the brush 52d thus substantially eliminates the gap existing between the lateral wall portion 52c and the upper surface of the first conveyor 20. As such, when the paddle 52 is moved from the first position and across the rejection zone 20a to the second position, the brush 52d provides a sweeping force across the upper surface of the first conveyor 20, which ensures that smaller parcels 12a, 12b, 12c, such as flat mailers, are engaged by the paddle 52 and do not pass under the lateral wall portion 52c of the paddle 52. Preferably, the brush 52d is removably mounted to the lateral wall portion 52c by one or more fasteners 57, such as bolts or similar conventional fasteners.

In at least some embodiments, the components of the paddle 52 are constructed of steel or another suitable metal to prevent or limit the extent to which the paddle 52 is deformed or broken down as a result of repeated trips across the rejection zone 20a and engagement with parcels 12a, 12b, 12c located thereon. To reduce the strain imposed on the upright portion 52b of the paddle 52 as a result of the forces acting on the lateral wall portion 52c, in this exemplary embodiment, a plurality of openings 52e are defined by, and thus can be characterized as being present within, the lateral wall portion 52c. Such openings 52e reduce the overall weight of the lateral wall portion 52c.

Referring still to FIGS. 1A, 1B, and 2-3, in this exemplary embodiment, the rejection mechanism 50 further includes a way cover 60. The way cover 60 has a first end 60a fixed in position relative to the conveyor system 10 and a second end 60b mounted to the lateral wall portion 52c of the paddle 52. Specifically, in this exemplary embodiment, the first end 60a of the way cover 60 is mounted to a bracket 22 mounted to the first conveyor 20 by one or more fasteners (not shown), such as bolts or similar conventional fasteners, and the second end 60b of the way cover 60 is mounted to a rear face of the lateral wall portion 52c of the paddle 52 by one or more fasteners 55, such as bolts or similar conventional fasteners.

As evidenced again by viewing FIGS. 1A and 1B in sequence, the way cover 60 is configured to expand and contract with movement of the paddle 52. As the paddle 52 is moved by the linear actuator 54 from the first position and across the rejection zone 20a to the second position, the way cover 60 gradually expands from a contracted configuration (as shown in FIG. 1A) to an expanded configuration (as shown in FIG. 1B). In this exemplary embodiment, the way cover 60 is designed and configured such that, upon the paddle 52 reaching the second position (FIG. 1B), the way cover 60 is fully expanded, resulting in a substantially flat upper surface of the way cover 60. The way cover 60 thus provides a trailing wall behind the lateral wall portion 52c of the paddle 52, which fill in the space behind the lateral wall portion 52c of the paddle 52 as the paddle 52 moves from the first position to the second position, thereby preventing any parcels located on the first conveyor 20 from falling behind the lateral wall portion 52c of the paddle 52 as the paddle 52 moves between the first position and the second position. In this way, the way cover 60 prevents parcels from becoming trapped behind the lateral wall portion 52c of the paddle 52 during operation of the rejection mechanism 50. In the absence of the way cover 60, a parcel could flip over the lateral wall portion 52c of the paddle 52 as the paddle 52 moves from the first position and the second position, which could hinder or prevent the paddle 52 from returning back to the first position.

Although not shown, as a further refinement, in some embodiments, the conveyor system 10 may include a wall surface positioned above the way cover 60, which would push any parcels 12a, 12b, 12c having fallen on top of the way cover 60 off of the way cover 60 as the paddle 52 is returned by the linear actuator 54 to the first position. In other words, if any parcels flip over the lateral wall portion 52c of the paddle 52 and onto the upper surface of the way cover 60, they would be pushed off the upper surface of the way cover 60 as the paddle 52 returns back to the first position.

Figure 4:
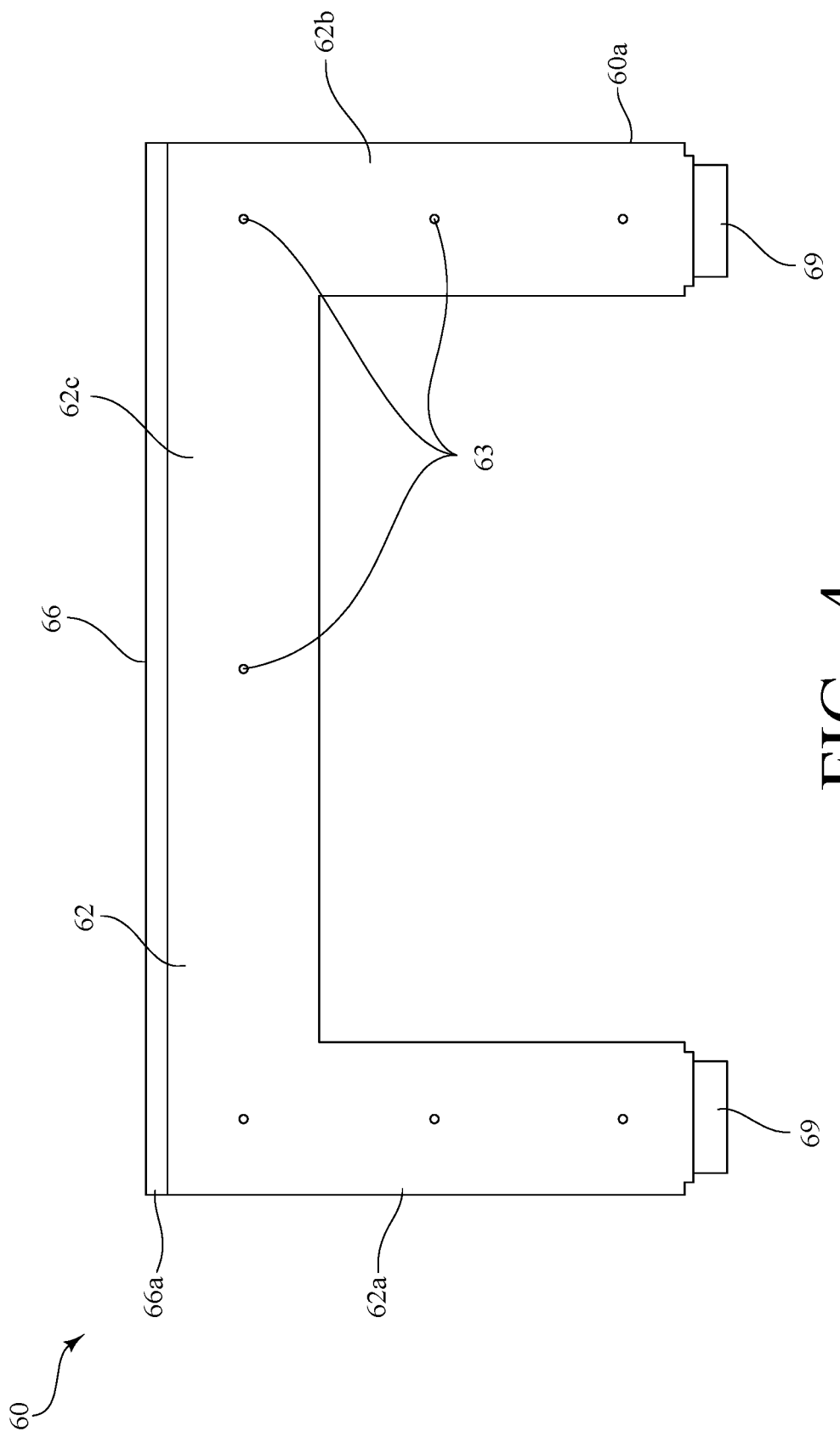
FIG. 4 is an enlarged front view of the way cover of the exemplary rejection mechanism of FIG. 2 in isolation.

FIG. 4 is an enlarged front view of the way cover 60 in isolation.

Referring now to FIGS. 3 and 4, in this exemplary embodiment, the way cover 60 is comprised of a first face plate 62, a second face plate 64, a cover 66, and a plurality of stiffeners 68. The first face plate 62, which is at the second end 60b of the way cover 60, is mounted to the lateral wall portion 52c of the paddle 52. To this end, the first face plate 62 defines a plurality of openings 63 corresponding to a plurality of openings defined by the lateral wall portion 52c, so that the first face plate 62 can be mounted to the lateral wall portion 52c via one or more fasteners 55, such as bolts or similar conventional fasteners. In this exemplary embodiment, the first face plate 62 can be characterized as including three sections: a first side section 62a; a second side section 62b; and a top section 62c extending between the first and second side sections 62a, 62b. Furthermore, in this exemplary embodiment, the width and the height of the first face plate 62 substantially corresponds to that of the lateral wall portion 52c of the paddle 52.

Referring still to FIGS. 3 and 4, the second face plate 64 is mounted to a component of the conveyor system 10 to hold the first end 60a of the way cover 60 in a fixed position as the paddle 52 moves the first face plate 62, and thus the second end 60b of the way cover 60, across the rejection zone 20a. In this exemplary embodiment, and as mentioned above, the second face plate 64 is mounted to the bracket 22, which is shown in FIGS. 1A and 1B. The shape of the second face plate 64 preferably corresponds to that of the first face plate 62, and thus, in this exemplary embodiment, the lateral wall portion 52c of the paddle 52. Although not shown, the second face plate 64 thus also defines a plurality of openings corresponding to a plurality of openings defined by the bracket 22, so that the second face plate 64 can be mounted to the bracket 22 via one or more fasteners (not shown), such as bolts or similar conventional fasteners Referring now to FIGS. 1A, 1B, and 2-4, to facilitate extension and contraction of the way cover 60, the opposing ends 66a, 66b of the cover 66 are mounted to the first face plate 62 and the second face plate 64, and the cover 66 is comprised of a flexible fabric or similar material that can readily expand or contract as the paddle 52 is moved between the first position and the second position. Multiple stiffeners 68 are positioned along the length of the cover 66 between the opposing ends 66a, 66b of the cover 66, and these stiffeners 68 are mounted to and enclosed by the cover 66. The stiffeners 68 maintain the shape of the trailing wall established by the way cover 60 as the paddle 52 moves between the first position and the second position. In this exemplary embodiment, the stiffeners 68 are at equally spaced intervals along the length of the way cover 60. Furthermore, in this exemplary embodiment, each stiffener 68 is constructed of a metal plate having a shape corresponding to that of the first face plate 62 and the lateral wall portion 52c of the paddle 52. Accordingly, like the first face plate 62, each stiffener 68 can be characterized as including three sections: a first side section; a second side section; and a top section extending between the first and second side sections. The cover 66 extends along and fully covers the first side section, the second side section, and the top section of each stiffener 68. Thus, the cover 66 establishes a three-sided wall (two side walls and a top wall), which expands and contracts with movement of the paddle 52. As shown, the flexible material of the cover 66 is configured to fold in an accordion-like manner as the paddle 52 is moved from the second position to the first position and the way cover 60 contracts. In this regard, the way cover 60 may also be referred to as a "bellows."

As perhaps best shown in FIG. 3, in this exemplary embodiment, each stiffener 68 includes a tip 69 on at least one of its sides. Specifically, in this exemplary embodiment, each side (only one of which is shown in FIG. 3) of each stiffener 68 terminates at a tip 69. Each tip 69 is configured to engage and move along an upper surface of the first conveyor 20 as the paddle 52 moves across the rejection zone 20a. In this exemplary embodiment, the lowermost portion of each tip 69 and the lowermost portion of the brush 52d reside in substantially the same plane. The tips 69 maintain the lateral wall portion 52c of the paddle 52 in a generally parallel orientation relative to the upper surface of the first conveyor 20 and reduce the strain imposed on the upright portion 52b caused by the weight of the lateral wall portion 52c. To ensure that each tip 69 effectively glides across the upper surface of the first conveyor 20 and will not damage the upper surface of the first conveyor 20, each tip 69 is preferably constructed from a material with a low coefficient of friction and high durability, such as an ultra-high molecular weight polyethylene (UHMW).

Although not shown, as a further refinement, in some embodiments, the way cover 60 may further include a plurality of lamellas (or plates) provided along each wall of the cover 66. In such embodiments, each lamella would be mounted to a respective wall of the cover 66, such that the lamellas effectively stack upon each other as the way cover 60 contracts. In such embodiments, the lamellas effectively cover the "valleys" resulting from the cover 66 being folded into an accordion-like construction, thereby preventing parcels 12a, 12b, 12c from becoming caught or trapped in the way cover 60 as it is contracted.

In some alternative embodiments, rather than a "bellows" structure, the way cover may be constructed as to transition between a rolled-up configuration and an extended (or unrolled) configuration. Like the way cover 60 described above with reference to FIGS. 3-4, the way cover would have a first end fixed in position relative to the conveyor system and a second end mounted to the lateral wall portion of the paddle. However, it would not include any of the plates 62, 64 or stiffeners 68 described above with reference to FIGS. 3-4. Rather, the way cover would include a single length of material that is rolled onto a rod, much like a roll-up window shade. When the paddle 52 is in the first position, the material would be stored on the rod in the rolled-up configuration. As the paddle 52 moves to the second position, the rod would rotate, and the material would unfurl from the rod until the way cover is in the extended (or unrolled) configuration. In that extended (or unrolled) configuration, the way cover would again provide a wall extending across the rejection zone 20a of the first conveyor 20.

Figure 5A:
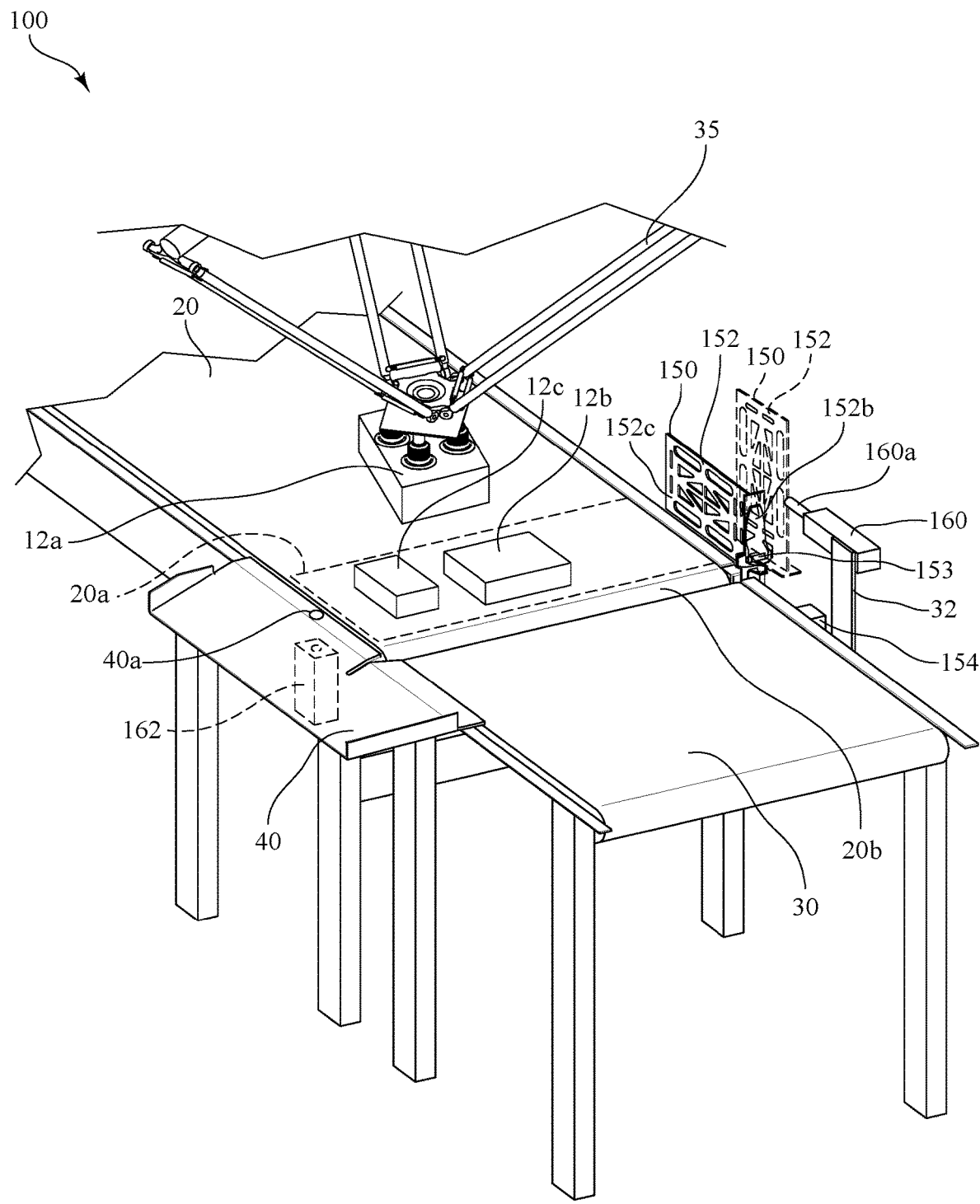
FIG. 5A is a perspective view of another conveyor system including another exemplary rejection mechanism made in accordance with the present invention, with the paddle of the exemplary rejection mechanism in a first position.
Figure 5B:
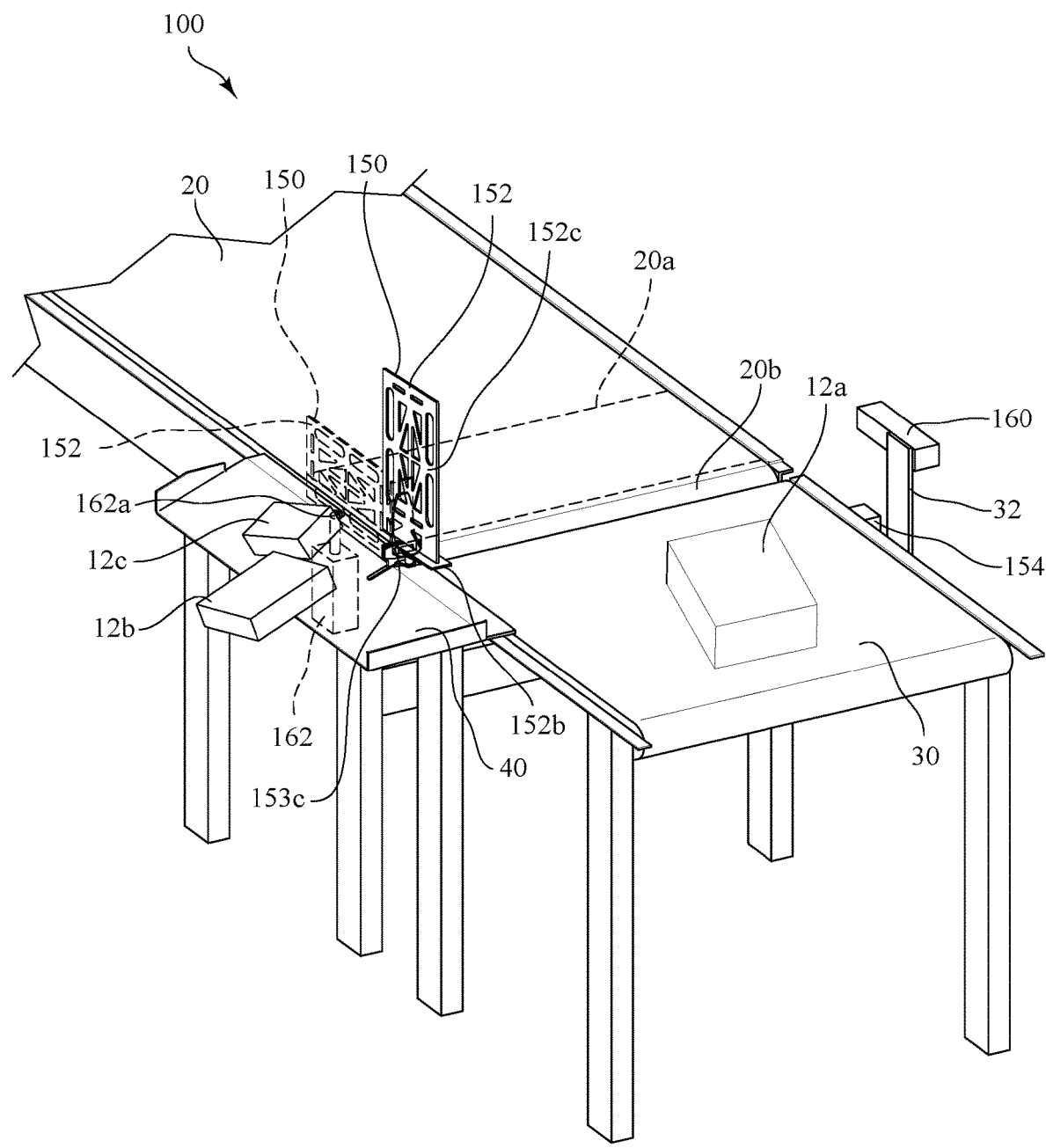
FIG. 5B is a perspective view similar to FIG. 5A, but with the paddle of the exemplary rejection mechanism in a second position.

FIGS. 5A and 5B are perspective views of another conveyor system 100 for conveying and transferring parcels 12a, 12b, 12c, which includes another exemplary rejection mechanism 150 made in accordance with the present invention. As shown in FIGS. 5A and 5B, the conveyor system 100 includes each of the components (i.e., the first conveyor 20, the second conveyor 30, robot singulator 35, and rejection chute 40) of the conveyor system 10 illustrated and described above with reference to FIGS. 1A and 1B, where each respective component includes the same features and provides the same functionality as described above.

As evidenced by viewing FIGS. 5A and 5B in sequence, like the rejection mechanism 50 described above with reference to FIGS. 1A, 1B, and 2, the rejection mechanism 150 is selectively activated to push parcels 12b, 12c located in the rejection zone 20a off of the first conveyor 20 and onto a rejection chute 40 positioned to the side of the first conveyor 20 for subsequent sorting or recirculation back to the first conveyor 20. Following discharge of the parcels 12b, 12c onto the rejection chute 40, the rejection mechanism 150 can be returned to its home position, and the first conveyor 20 is indexed forward to facilitate subsequent sorting of any remaining parcels located on the first conveyor 20. As further described below with reference to FIG. 12, movement of the first conveyor 20, second conveyor 30, and/or the robot singulator 35 are, in at least some embodiments, regulated by a control subsystem 400.

Figure 6:
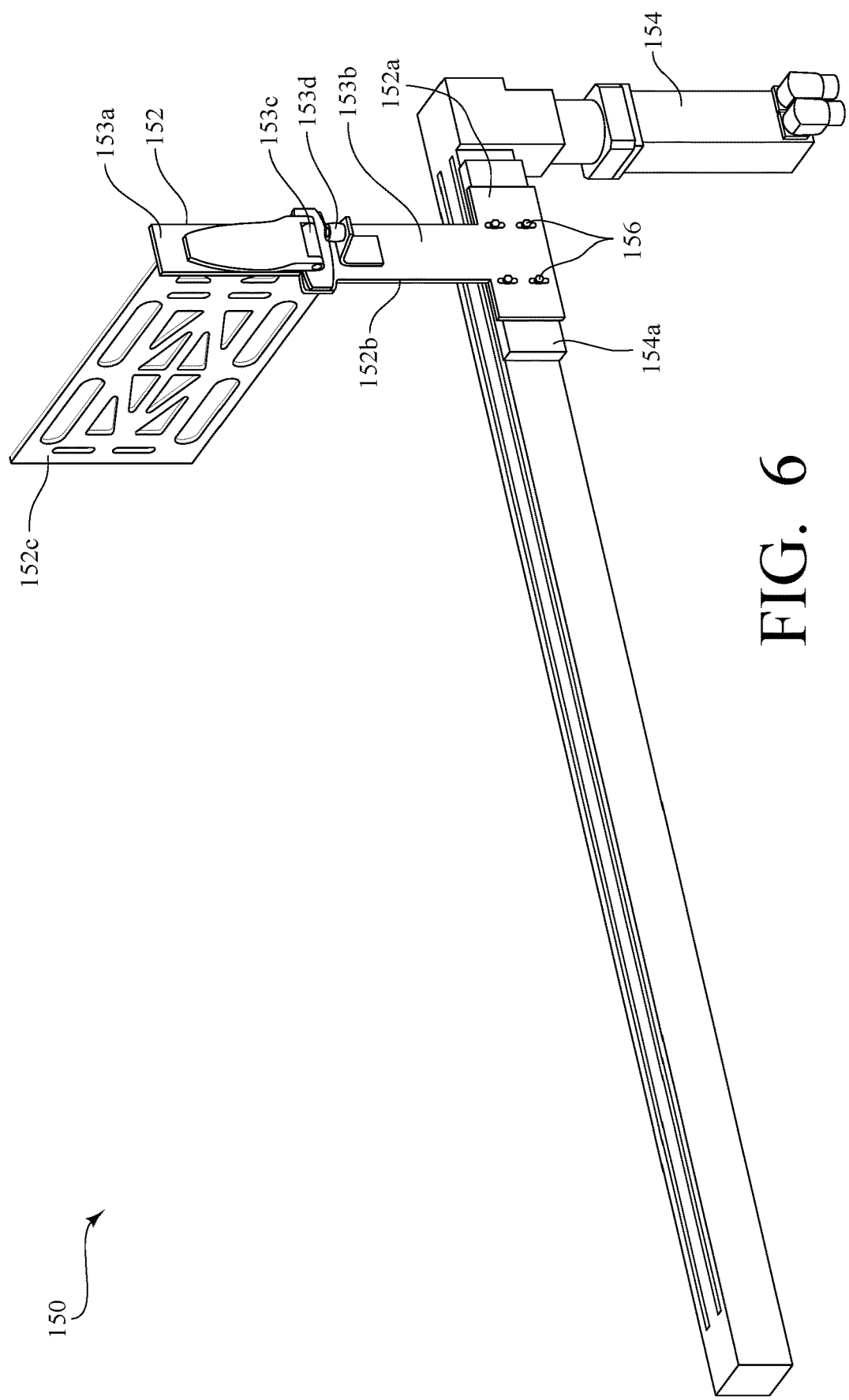
FIG. 6 is a perspective view of the exemplary rejection mechanism of FIG. 5A.

FIG. 6 is a perspective view of the exemplary rejection mechanism 150, in isolation from the other components of the conveyor system 100 shown in FIGS. 5A and 5B.

Referring now to FIGS. 5A, 5B, and 6, in this exemplary embodiment, the rejection mechanism 150 includes a paddle 152 that is mounted on a linear actuator 154, such that the paddle 152 can be moved between a first (or home) position, as shown in FIG. 5A, and a second position, as shown in FIG. 5B, via the linear actuator 154. In this exemplary embodiment, the linear actuator 154 is a motor-controlled actuator, with a carriage 154a that moves between the first position and the second position. Many suitable linear actuators are commercially available. For example, one suitable linear actuator for this purpose is manufactured and distributed by Schneider Electric USA of Andover, Mass., Model. No. PAS42BB. Of course, this is only one example of a suitable actuator, and many other forms of pneumatic or motor-controlled actuators could be incorporated into the rejection mechanism 150 and still enable the rejection mechanism 150 to operate as intended and described herein. For example, in alternative embodiments, the linear actuator 154 may be a rod-less pneumatic actuator, such as that manufactured and distributed by Festo Corporation of Hauppauge, N.Y., Model No. DGC-32-1200-KF-YSRW-A ZUB-F-M. As further described below with reference to FIG. 12, in some embodiments, operation of the linear actuator 154 (i.e., movement of the carriage 154a) may be regulated, at least in part, by a control subsystem 400.

As perhaps best shown in FIG. 6, in this exemplary embodiment, the paddle 152 includes: a lower bracket portion 152a; an upright portion 152b that extends from the lower bracket portion 152a; and a lateral wall portion 152c that extends from the upright portion 152b. The respective components of the paddle 152 may be constructed from the same materials as those of the paddle 52 of the rejection mechanism 50 described above with reference to FIGS. 1A, 1B, and 2. Furthermore, the lateral wall portion 152c of the paddle 152 may also define a plurality of openings for weight reduction, like the rejection mechanism 50 described above with reference to FIGS. 1A, 1B, and 2. The lower bracket portion 152a is mounted to the carriage 154a of the linear actuator by one or more fasteners 156, such as bolts or similar conventional fasteners.

Referring still to FIG. 6, in this exemplary embodiment, the upright portion 152b of the paddle 152 includes an upper section 153a and a lower section 153b connected together by a hinge 153c. The lateral wall portion 152c is operably connected to and extends from the upper section 153a of the upright portion 152b, while the lower section 153b of the upright portion 152b is operably connected to the lower bracket portion 152a of the paddle 152. In this exemplary embodiment, the lower section 153b of the upright portion 152b and the lower bracket portion 152a are formed from a single piece of material, i.e., have a unitary construction. As a result of the foregoing construction, the upper section 153a of the upright portion 152b can thus effectively rotate about an axis of rotation defined by the hinge 153c to transition the lateral wall portion 152c of the paddle 152 between: (i) an engaged position, in which the lateral wall portion 152c of the paddle is in a substantially horizontal orientation (i.e., extends perpendicular relative to the lower section 153b of the upright portion 152b); and (ii) a disengaged position, in which the lateral wall portion 152c of the paddle is in a substantially vertical orientation (i.e., extends vertically relative to the lower section 153b of the upright portion 152b). As a further refinement, in this exemplary embodiment, the paddle 152 also includes a stop 153d mounted to the lower section 153b of the upright portion 152b, which prevents rotation of the upper section 153a of the upright portion 152b beyond a predefined limit when the lateral wall portion 152c of the paddle 152 is transitioned to a disengaged position.

Referring now again to FIGS. 5A and 5B, the rejection mechanism 150 is positioned relative to the first conveyor 20, such that, as the paddle 152 moves from the first position to the second position while the lateral wall portion 152c is in the engaged position, the paddle 152 moves across the rejection zone 20a toward the rejection chute 40. The movement of the lateral wall portion 152c of the paddle 152 across the rejection zone 20a, while in the engaged position, thus pushes any parcels 12b, 12c located in the rejection zone 20a off of the first conveyor 20 and onto the rejection chute 40. The linear actuator 154 of the rejection mechanism 150 can thus be selectively activated while the lateral wall portion 152c is in the engaged position to discharge parcels 12b, 12c from the first conveyor 20.

Referring still to FIGS. 5A and 5B, the linear actuator 154 (only a portion of which is shown in FIGS. 5A and 5B) is mounted below the leading edge 20b of the first conveyor 20, such that both the upper section 153a and the lower section 153b of the upright portion 152b of the paddle 152 extend upward and adjacent to the leading edge 20b of the first conveyor 20 when the lateral wall portion 152c is in the engaged position. In the conveyor system 100 shown in FIGS. 5A and 5B, the second conveyor 30 is positioned downstream of and adjacent to the first conveyor 20, such that the upright portion 152b of the paddle 152 extends upward through a gap between the first conveyor 20 and the second conveyor 30. Of course, in other embodiments, the linear actuator 154 may alternatively be mounted to the second conveyor 30 and still enable the exemplary rejection mechanism 150 to function in the manner described herein.

Referring still to FIGS. 5A and 5B, to prevent parcels 12a, 12b, 12c from passing under the lateral wall portion 152c of the paddle 152 as the paddle 152 transitions from the first position across the rejection zone 20a of the first conveyor 20 to the second position while the lateral wall portion 152c is in the engaged position, it is generally preferred that there is a minimal vertical gap between the bottom edge of the lateral wall portion 152c of the paddle 152 and the upper surface of the first conveyor 20. For example, in some embodiments, this vertical gap may be approximately 10 mm.

Referring now to FIG. 5B, in this exemplary embodiment, after the linear actuator 154 has moved the paddle 152 from the first position to the second position, and thus pushed the parcels 12b, 12c that are in the rejection zone 20a from the first conveyor 20 onto the rejection chute 40, the lateral wall portion 152c of the paddle 152 can be rotated from the engaged position to the disengaged position about the hinge 153c. Accordingly, when the linear actuator 154 returns the paddle 152 from the second position to the first position, the lateral wall portion 152c of the paddle 152 does not pass back over the rejection zone 20a. Rather, the lateral wall portion 152c is in a substantially vertical orientation during its return to the first position. Accordingly, in the event that any parcels have entered the rejection zone 20a after the paddle 152 has reached the second position, such parcels will not impede the movement of the paddle 152 from the second position back to the first position, as the lateral wall portion 152c is no longer positioned over an upper surface of the first conveyor 20. After the paddle 152 has returned to the first position, the lateral wall portion 152c of the paddle can be rotated from the disengaged position back to the engaged position (as shown in FIG. 5A).

Referring again to FIGS. 5A and 5B, in this exemplary embodiment, to facilitate rotation of the lateral wall portion 152c of the paddle 152 between the engaged position and the disengaged position, the conveyor system 100 further includes a first pushing mechanism 160 and a second pushing mechanism 162. In this exemplary embodiment, and as best shown in FIG. 5A, the first pushing mechanism 160 is a motor-controlled linear actuator, which includes an arm 160a that can be extended to engage the lateral wall portion 152c of the paddle 152, rotating it about the hinge 153c from the disengaged position to the engaged position. Similarly, and as best shown in FIG. 5B, the second pushing mechanism 162 is a motor-controlled linear actuator, which includes an arm 162a that can be extended to engage the lateral wall portion 152c of the paddle 152, rotating it about the hinge 153c from the engaged position to the disengaged position. Of course, many different types of linear actuators or other similar mechanisms may provide the desired rotation (or flipping) of the lateral wall portion 152c of the paddle 152 between the engaged position and the disengaged position.

Referring now specifically to FIG. 5A, in this exemplary embodiment, the first pushing mechanism 160 is mounted such that the arm 160a of the first pushing mechanism 160 can be extended in a substantially horizontal direction to engage the lateral wall portion 152c of the paddle 152 when the paddle 152 is in the first position. As the arm 160a of the first pushing mechanism 160 is extended, the lateral wall portion 152c rotates about the axis of rotation defined by the hinge 153c from the disengaged position to the engaged position. In other words, the first pushing mechanism 160 flips the lateral wall portion 152c from the disengaged position to the engaged position. Specifically, in this exemplary embodiment, the first pushing mechanism 160 is mounted to the second conveyor 30 by a bracket 32. Of course, the first pushing mechanism 160 may be mounted in any suitable orientation which permits the arm 160a to extend and engage the lateral wall portion 152c of the paddle 152 in the manner described above.

Referring now specifically to FIG. 5B, in this exemplary embodiment, the second pushing mechanism 162 is mounted such that the arm 162a of the second pushing mechanism 162 can be extended in a substantially vertical direction to engage the lateral wall portion 152c of the paddle 152 when the paddle 152 is in the second position. As the arm 162a of the second pushing mechanism 162 is extended, the lateral wall portion 152c rotates about the axis of rotation defined by the hinge 153c from the engaged position to the disengaged position. In other words, the second pushing mechanism 162 flips the lateral wall portion 152c from the engaged position to the disengaged position. Specifically, in this exemplary embodiment, the second pushing mechanism 162 is mounted to the first conveyor 20 below the rejection chute 40. Thus, in this exemplary embodiment, the rejection chute 40 defines an opening 40a through which the arm 162a of the second pushing mechanism 162 can extend to engage the lateral wall portion 152c of the paddle 152. Of course, the second pushing mechanism 162 may be mounted in any suitable orientation which permits the arm 162a of the second pushing mechanism 162 to extend and engage the lateral wall portion 152c of the paddle 152 in the manner described above.

As further described below with reference to FIG. 12, operation of the linear actuator 154, the first pushing mechanism 160, and/or the second pushing mechanism 162 are, in at least some embodiments, regulated by a control subsystem 400.

Figure 7A:
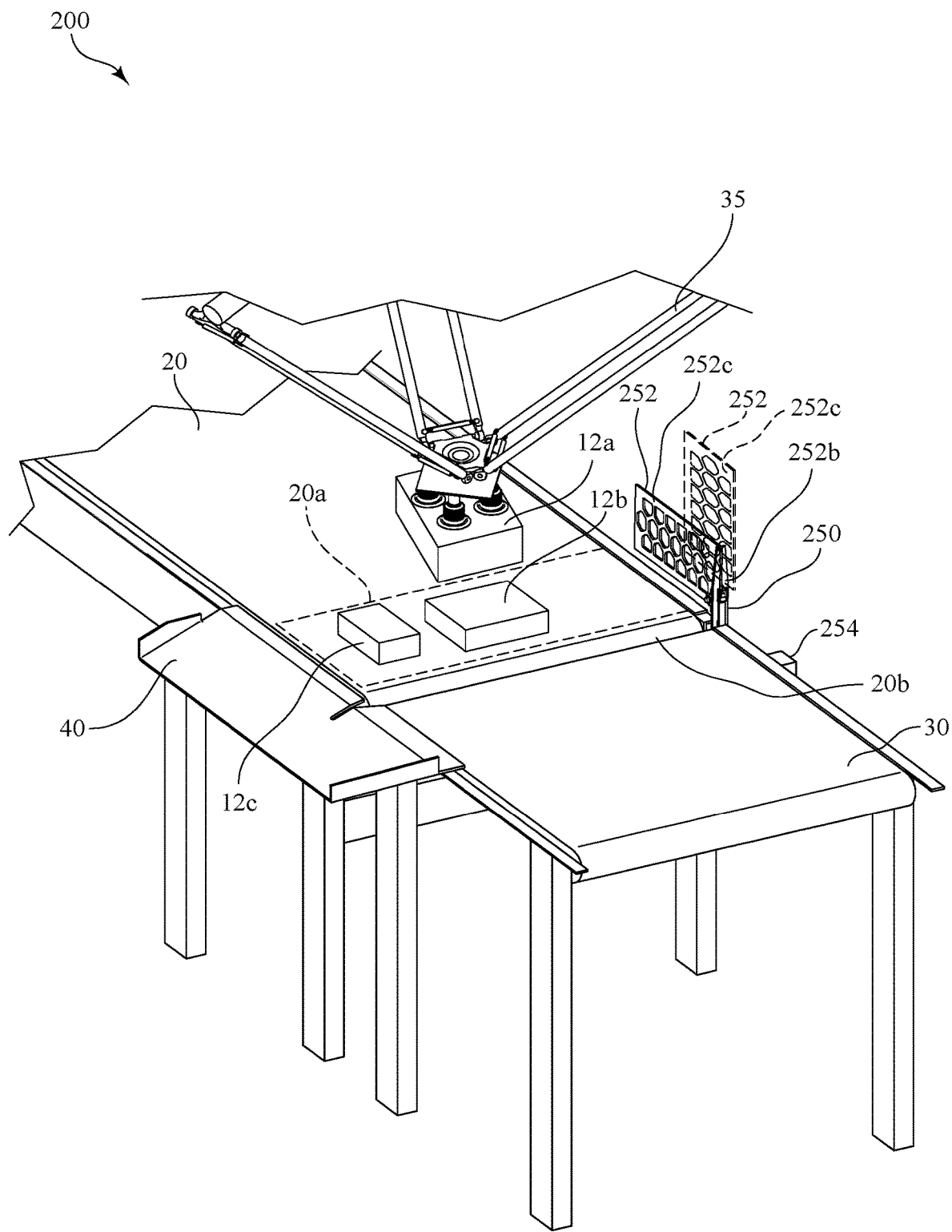
FIG. 7A is a perspective view of another conveyor system including another exemplary rejection mechanism made in accordance with the present invention, with the paddle of the exemplary rejection mechanism in a first position.
Figure 7B:
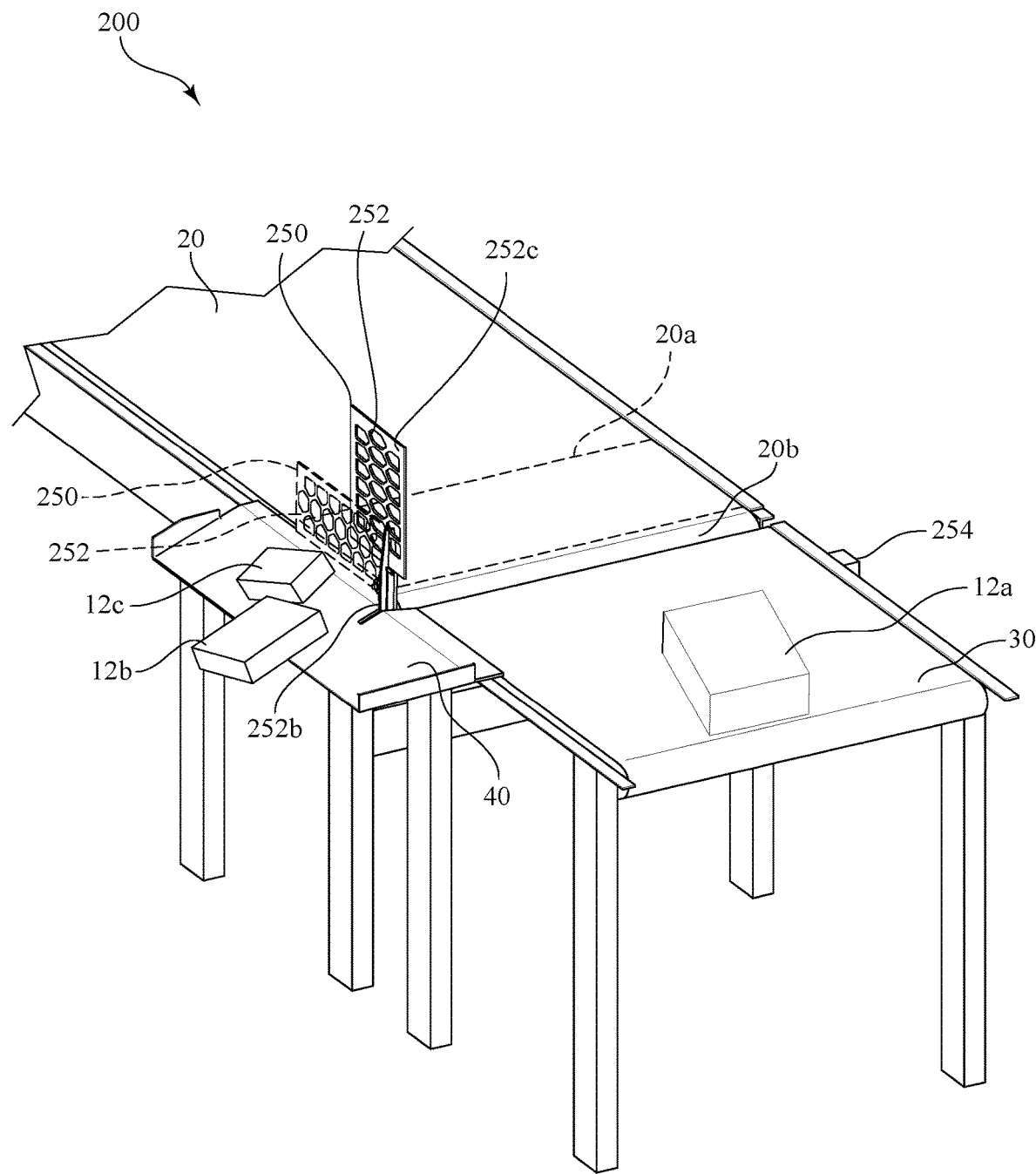
FIG. 7B is a perspective view similar to FIG. 7A, but with the paddle of the exemplary rejection mechanism in a second position.

FIGS. 7A and 7B are perspective views of another conveyor system 200 for conveying and transferring parcels 12a, 12b, 12c, which includes another exemplary rejection mechanism 250 made in accordance with the present invention. As shown in FIGS. 7A and 7B, the conveyor system 200 includes each of the components (i.e., the first conveyor 20, the second conveyor 30, robot singulator 35, and rejection chute 40) of the conveyor system 10 illustrated and described above with reference to FIGS. 1A and 1B, where each respective component includes the same features and provides the same functionality as described above.

As evidenced by viewing FIGS. 7A and 7B in sequence, like the rejection mechanisms 50, 150 described above, the exemplary rejection mechanism 250 is selectively activated to push parcels 12b, 12c located in the rejection zone 20a off of the first conveyor 20 and onto a rejection chute 40 positioned to the side of the first conveyor 20 for subsequent sorting or recirculation back to the first conveyor 20. Following discharge of the parcels 12b, 12c onto the rejection chute 40, the rejection mechanism 250 can be returned to its home position, and the first conveyor 20 is indexed forward to facilitate subsequent sorting of any remaining parcels located on the first conveyor 20. As further described below with reference to FIG. 11, operation of the first conveyor 20, second conveyor 30, and/or the robot singulator 35 are, in at least some embodiments, regulated by a control subsystem 300.

Figure 8:
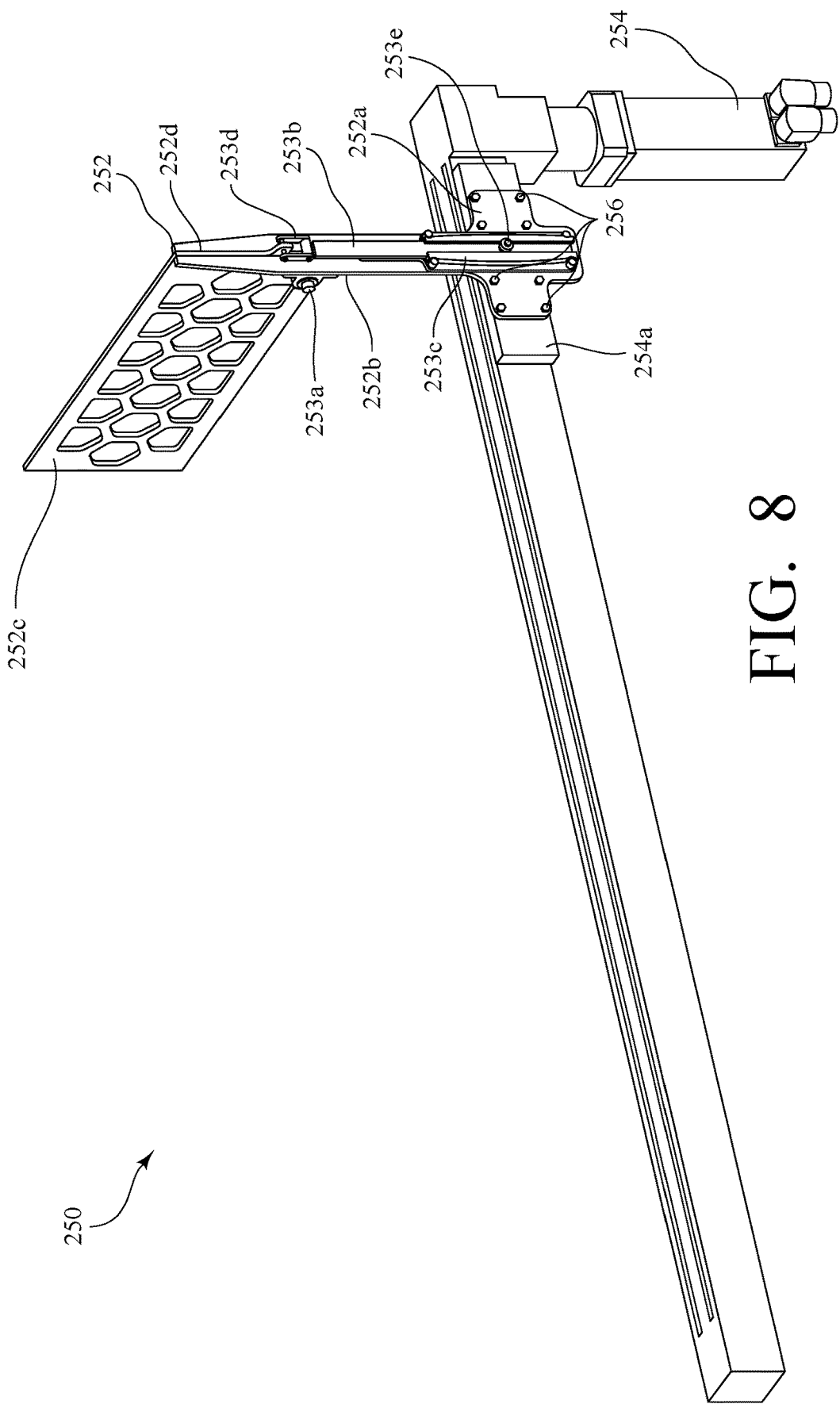
FIG. 8 is a perspective view of the exemplary rejection mechanism of FIG. 7A.

FIG. 8 is a perspective view of the exemplary rejection mechanism 250, in isolation from the other components of the conveyor system 200 shown in FIGS. 7A and 7B.

Referring now to FIGS. 7A, 7B, and 8, in this exemplary embodiment, the rejection mechanism 250 includes a paddle 252 that is mounted on a linear actuator 254, such that the paddle 252 can be moved between a first (or home) position, as shown in FIG. 7A, and a second position, as shown in FIG. 7B, via the linear actuator 254. In this exemplary embodiment, the linear actuator 254 is a motor-controlled actuator, with a carriage 254a that moves between the first position and the second position. Many suitable linear actuators are commercially available. For example, one suitable linear actuator for this purpose is manufactured and distributed by Schneider Electric USA of Andover, Mass., Model. No. PAS42BB. Of course, this is only one example of a suitable actuator, and many other forms of pneumatic or motor-controlled actuators could be incorporated into the rejection mechanism 250 and still enable the rejection mechanism 250 to operate as intended and described herein. For example, in alternative embodiments, the linear actuator 254 may be a rod-less pneumatic actuator, such as that manufactured and distributed by Festo Corporation of Hauppauge, N.Y., Model No. DGC-32-1200-KF-YSRW-A ZUB-F-M. As further described below with reference to FIG. 11, in at least some embodiments, operation of the linear actuator 254 (i.e., movement of the carriage 254a) is regulated by a control subsystem 300.

As perhaps best shown in FIG. 8, in this exemplary embodiment, the paddle 252 includes: a lower bracket portion 252a; an upright portion 252b that extends from the lower bracket portion 252a; and a lateral wall portion 252c that extends from the upright portion 252b. The respective components of the paddle 252 may be constructed from the same materials as those of the paddles 52, 152 of the rejection mechanisms 50, 150 described above. Furthermore, the lateral wall portion 252c of the paddle 252 may also define a plurality of openings for weight reduction, like the rejection mechanisms 50, 150 described above. The lower bracket portion 252a is mounted to the carriage 254a of the linear actuator by one or more fasteners 256, such as bolts or similar conventional fasteners.

Referring still to FIG. 8, in this exemplary embodiment, the lower bracket portion 252a and the upright portion 252b are formed from a single piece of material, i.e., have a unitary construction. The lateral wall portion 252c is connected to the upright portion 252b by a hinge 253a. As a result of the foregoing construction, the lateral wall portion 252c is able to rotate about an axis of rotation defined by the hinge 253a between: (i) an engaged position, in which the lateral wall portion 252c of the paddle 252 is in a substantially horizontal orientation (i.e., extends perpendicular relative to the upright portion 252b of the of the paddle 252); and (ii) a disengaged position, in which the lateral wall portion 252c is in a substantially vertical orientation (i.e., extends vertically relative to the upright portion 252b of the paddle). To facilitate movement of the lateral wall portion 252c between the engaged position and the disengaged position, in this exemplary embodiment, the upright portion 252b defines a slit 252d in which the lateral wall portion 252c can travel through and rest within, as further described below.

Referring still to FIG. 8, in this exemplary embodiment, to rotate the lateral wall portion 252c of the paddle 252 about the axis of rotation defined by the hinge 253a from the engaged position to the disengaged position, a first linkage 253b (or "linear slide") is mounted for sliding movement in a channel defined by a guide 253c, which, is mounted to a surface of the upright portion 252b of the paddle 252. In this exemplary embodiment, a distal end of the first linkage 253b is operably connected to the lateral wall portion 252c of the paddle 252, such that the first linkage 253b can be manipulated to slide the first linkage 253b within the guide 253c and move the lateral wall portion 252c between the engaged and disengaged position. Specifically, in this embodiment, a distal end of the first linkage 253b is pivotally connected to a proximal end of a second linkage 253d (or "connector linkage"), preferably via a pin connection. A distal end of the second linkage 253d is then pivotally connected to the lateral wall portion 252c of the paddle 252. A cam follower 253e is mounted for rotation with respect to, and extends from, the first linkage 253b to control movement of the first linkage 253b within the guide 253c, as further described below.

Referring now to FIGS. 7A and 7B, the linear actuator 254 (only a portion of which is shown in FIGS. 7A and 7B) is mounted below the leading edge 20b of the first conveyor 20, such that the upright portion 252b of the paddle 252 extends upward and adjacent to the leading edge 20b of the first conveyor 20. In the conveyor system 200 shown in FIGS. 7A and 7B, the second conveyor 30 is positioned downstream and adjacent to the first conveyor 20, such that the upright portion 252b of the paddle 252 extends upward through a gap between the first conveyor 20 and the second conveyor 30. Of course, in other embodiments, the linear actuator 254 may alternatively be mounted to the second conveyor 30 and still enable the exemplary rejection mechanism 250 to function in the manner described herein.

Figure 9A:
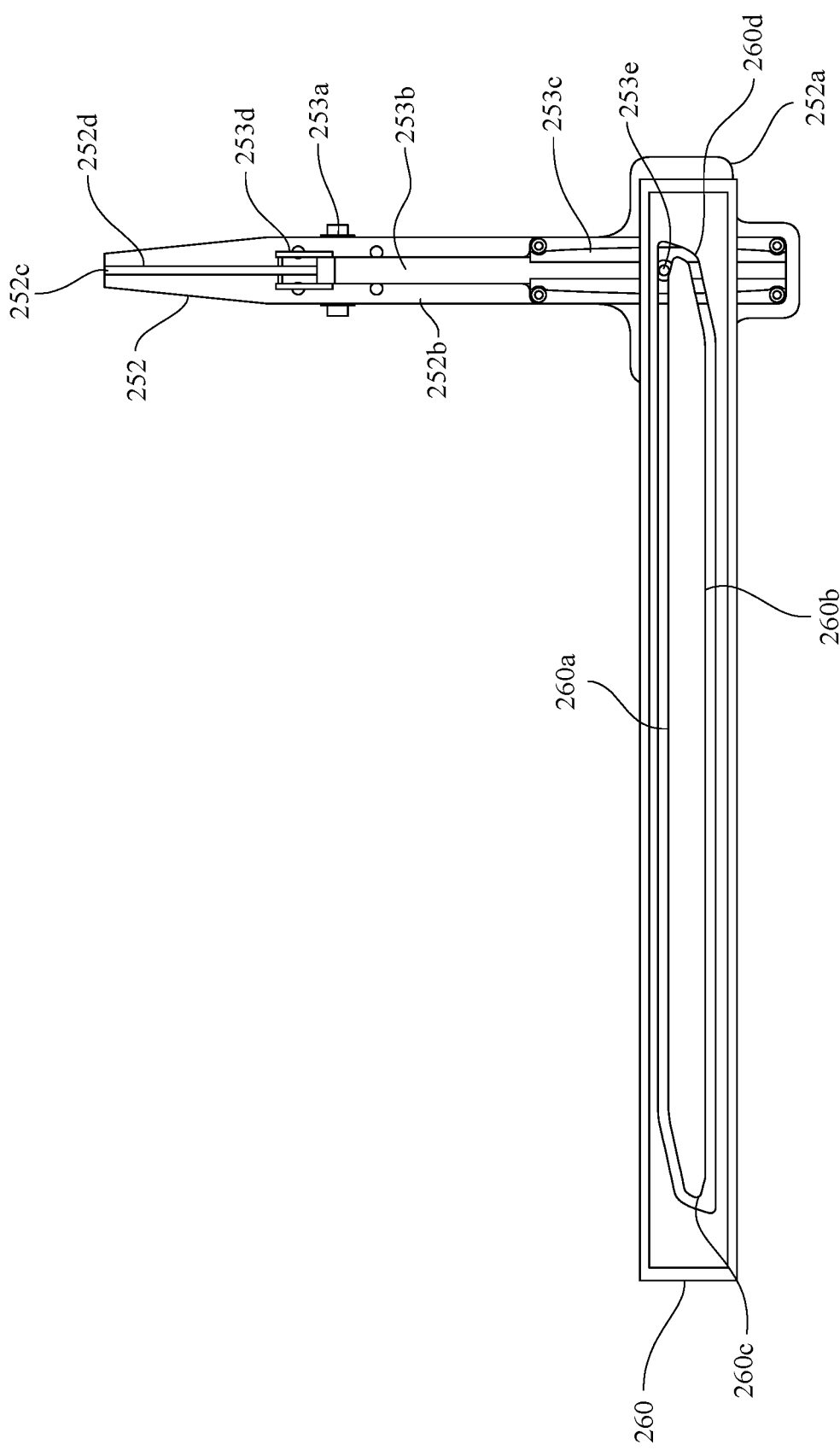
FIG. 9A is a side view of the paddle of the exemplary rejection mechanism of FIG. 8 at a first position along a track.

FIGS. 9A and 9B are various side views of the paddle 252 at different positions along a track.

Referring now to FIGS. 7A, 7B, 9A, and 9B, the cam follower 253e is positioned within a track 260 (or "linear cam"), such that, as the linear actuator 254 moves the paddle 252 between the first position (FIG. 7A) and the second position (FIG. 7B), the cam follower 253e is moved along the track 260 to transition the lateral wall portion 252c of the paddle between the engaged and disengaged position, as further described below. Although not shown in FIGS. 7A and 7B, in this embodiment, the track 260 is mounted below the leading edge of the first conveyor 20. Of course, in other embodiments, the track 260 may alternatively be mounted to the second conveyor 30 and still enable the exemplary rejection mechanism 250 to function in the manner described herein. As shown in FIGS. 9A and 9B, the track 260 is defined by, and can be characterized as including: an upper track portion 260a; a lower track portion 260b; a first inclined ramp 260c, which interconnects the upper track portion 260a and the lower track portion 260b; and a second inclined ramp 260d, which also interconnects the upper track portion 260a and the lower track portion 260b. In this regard, the track 260 is a closed loop.

Referring now to FIGS. 7A, 7B, 8, 9A, and 9B, as the paddle 252 is moved from the first position (FIG. 7A) to the second position (FIG. 7B), the cam follower 253e is correspondingly moved from a first portion of the track 260 (FIG. 9A), which, in this embodiment, is an upper-right portion of the track 260, to a second portion of the track 260, which, in this embodiment, is lower-left portion of the track 260. During movement from the first position to the second position, the lateral wall portion 252c of the paddle 252 is in the engaged position, and the weight of the lateral wall portion 252c of the paddle 252 causes it to remain in the engaged position. Thus, as the lateral wall portion 252c of the paddle moves over the rejection zone 20a of the first conveyor 20, as the paddle 252 is moved from the first position to the second position by the linear actuator 254, any parcels 12b, 12c located in the rejection zone 20a are pushed off of the first conveyor 20 and onto the rejection chute 40

Referring still to FIGS. 7A, 7B, 8, 9A, and 9B, during the movement of the paddle 252 from the first position to the second position, the cam follower 253e moves along the upper track portion 260a until reaching the first inclined ramp 260c, which, in this case, slopes downwardly to the lower track portion 260b. Upon reaching the first inclined ramp 260c, the cam follower 253e then moves from the upper track portion 260a to the lower track portion 260b. As the cam follower 253e transitions down the first inclined ramp 260c to the lower track portion 260b, the first linkage 253b slides to a lower position within the guide 253c. In turn, as the first linkage 253b slides downward in the channel defined by the guide 253c, a torque is effectively applied to the lateral wall portion 252c of the paddle 252 via the second linkage 253d, which causes the lateral wall portion 252c to rotate about the axis of rotation defined by the hinge 253a from the engaged position to the disengaged position. Once rotated into the disengaged position, the center of gravity of the paddle 252 has moved to the opposite side of the hinge 253a, such that the weight of the paddle 252 now biases it to remain in the disengaged position. The lateral wall portion 252c is now in a substantially vertical orientation during its return to the first position. As such, in the event any parcels have entered the rejection zone 20a after the paddle 252 has reached the second position, such parcels will not impede movement of the paddle 252 from the second position back to the first position, as the lateral wall portion 252c is no longer positioned over an upper surface of the first conveyor 20.

Referring still to FIGS. 7A, 7B, 8, 9A, and 9B, as the linear actuator 254 moves the paddle 252 from the second position back to the first position, the cam follower 253e moves from the second (lower-left) portion of the track 260 across the lower track portion 260b until reaching the second inclined ramp 260d, which, in this case, slopes upwardly. Upon reaching the second inclined ramp 260d, the cam follower 253e then moves from the lower track portion 260b to the upper track portion 260a. As the cam follower 253e moves up the second inclined ramp 260d to the upper track portion 260a, the first linkage 253b slides to a higher position within the guide 253c. In turn, as the first linkage 253b slides upwardly in the channel defined by the guide 253c, a torque is effectively applied to the lateral wall portion 252c of the paddle 252 via the second linkage 253d, which causes the lateral wall portion 252c to rotate about the axis of rotation defined by the hinge 253a from the disengaged position to the engaged position, and the paddle 252 is again ready to push parcels located in the rejection zone 20a onto the rejection chute 40.

In addition to changing the elevation and moving the cam follower 253e between the upper track portion 260a and the lower track portion 260b, the first inclined ramp 260c and the second inclined ramp 260d are also configured to prevent the cam follower 253e from receiving too much thrust, as excessive thrust can result in a whipping action and damaging impact to the cam follower 253e and/or the paddle 252 resulting from a sudden change in direction. In this regard, thrust is dependent on the incline angle at any given instant, from no thrust at 0° to maximum thrust at 45° to no thrust at 90°. This potential for damaging impact is further exacerbated by the fact that the cam follower 253e is accelerating into the first and second inclined ramps 260c, 260d, assuming that a constant actuating force is being supplied to move the paddle 252 between the first position and the second position, or vice versa. Thus, the first and second inclined ramps 260c, 260d are designed to generate enough thrust to match the moment needed to rotate the paddle 252 about the axis of rotation defined by the hinge 253a, but prevent damaging impact of the cam follower 253e as it engages each of the first and second inclined ramps 260c, 260d.

Figure 10:
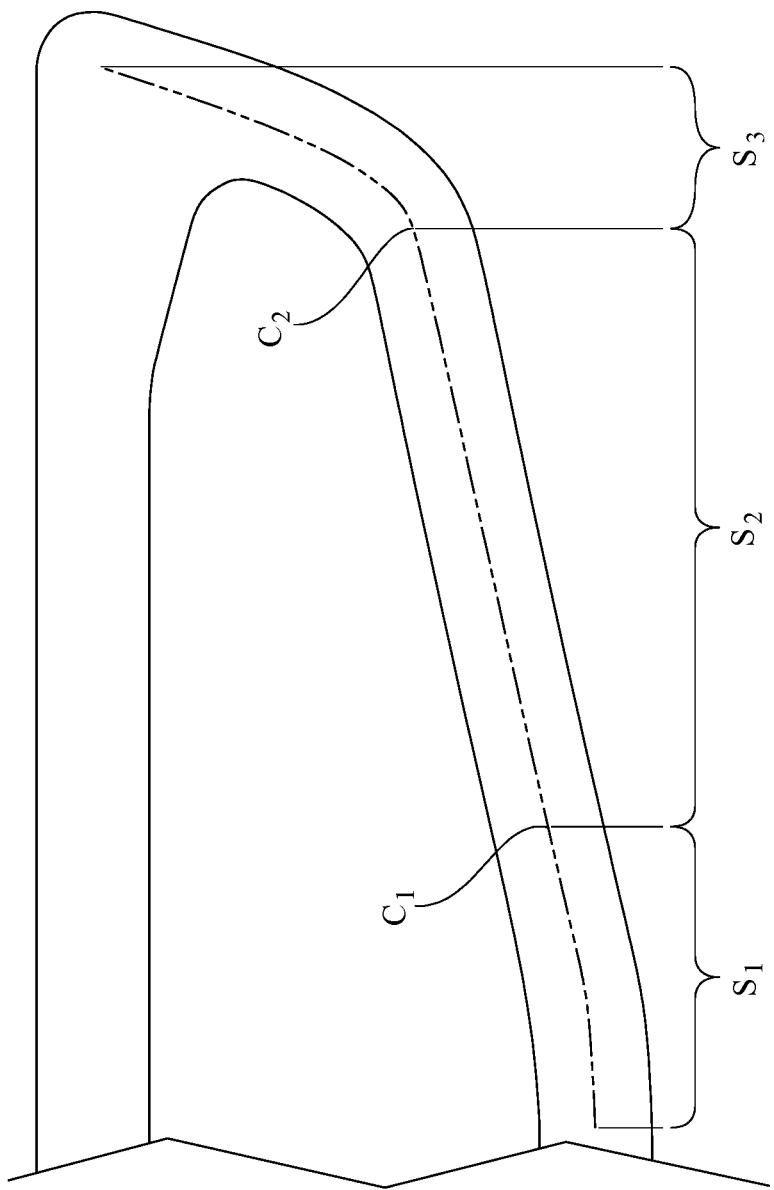
FIG. 10 is an enlarged partial view of the track for the paddle of the exemplary rejection mechanism of FIG. 8.

FIG. 10 shows an enlarged partial view of the second inclined ramp 260d of the track 260. As shown in FIG. 10, in this exemplary embodiment, the second inclined ramp 260d is formed from three parabolic track sections $S_1$, $S_2$, $S_3$ spliced together at points of continuity $C_1$, $C_2$. In this embodiment, the shape of the respective track sections $S_1$, $S_2$, $S_3$ are define by the following equations:

$$f(x) = \begin{cases} S_1 : 0.005x^2, & x \leq 24.933 \\ S_2 : \sqrt{\dfrac{x+100}{0.0322}} - 59.19, & 24.933 < x \leq 105.548 \\ S_3 : 0.0013(x - 98.554)^3 + 20.266, & x > 105.548 \end{cases}$$

Of course, the first inclined ramp 260c is formed in a similar manner, i.e., formed from three parabolic track sections spliced together, except the slope defined by the first inclined ramp 260c is inverted relative to the slope defined by the second inclined ramp 260d.

Figure 11:
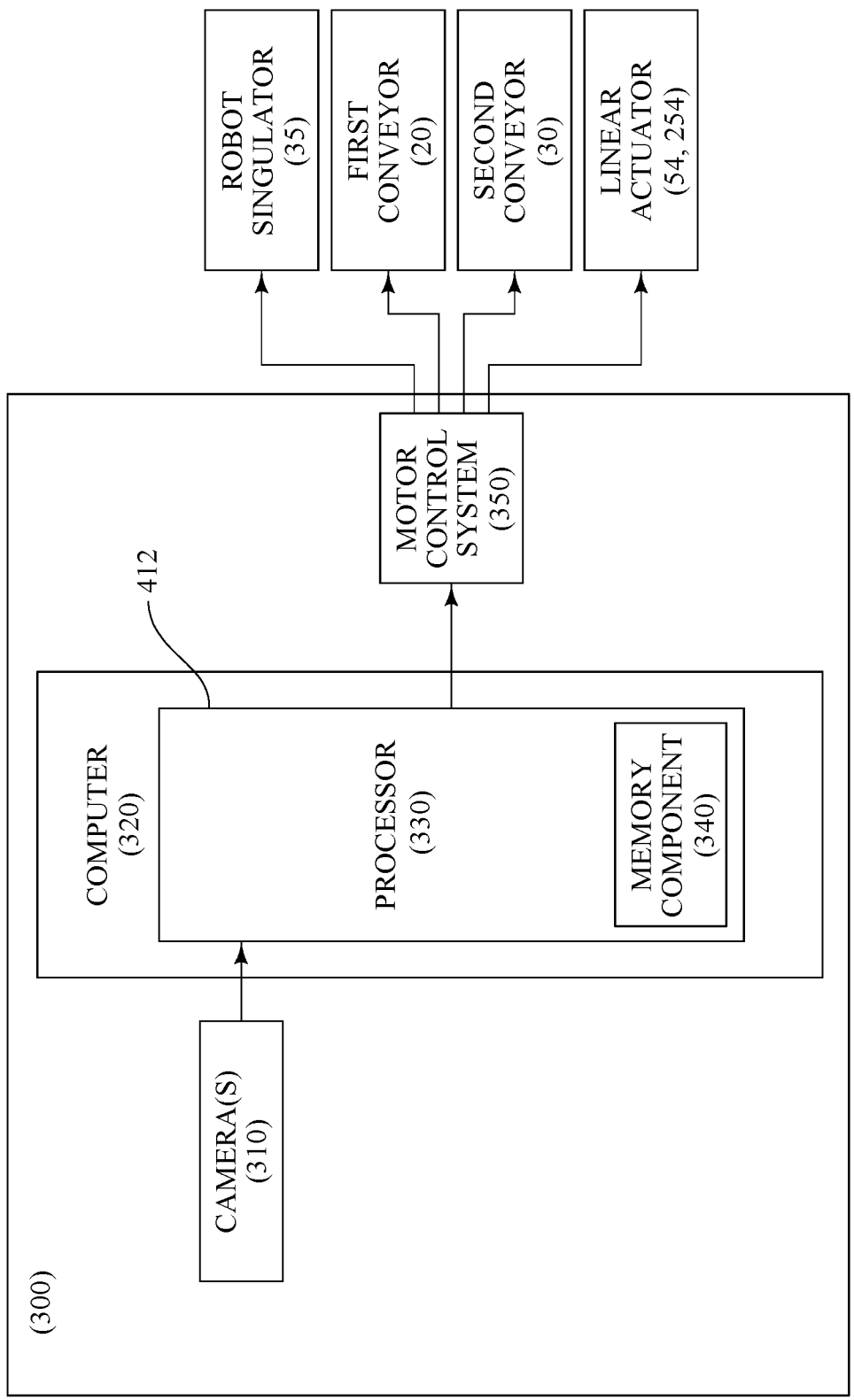
FIG. 11 is a schematic diagram of a control subsystem for a conveyor system that includes a rejection mechanism made in accordance with the present invention.

FIG. 11 is a schematic diagram of a control subsystem 300, which can be utilized with the conveyor systems 10, 200 described above with respect to FIGS. 1A, 1B, 7A, and 7B. As shown in FIG. 11, the control subsystem 300 includes one or more cameras 310, where each camera 310 is configured to collect environmental image data regarding the positioning of parcels 12a, 12b, 12c within the conveyor system 10, 100. In some embodiments, the control subsystem 300 may include a first camera and a second camera. In such embodiments, the first camera is preferably positioned adjacent to the robot singulator 35 and is focused on the location where a selected parcel 12a, 12b, 12c is to be engaged by the robot singulator 35, which, in this case is the first conveyor 20. The first camera thus collects two-dimensional and/or three-dimensional image data, which assists the robot singulator 35 in identifying the location of a parcel 12a, 12b, 12c to be engaged and subsequently transported to the second conveyor 30. The second camera is preferably positioned adjacent to the second conveyor 30 and focused on the area(s) where parcels 12a engaged by the robot singulator 35 are to be delivered. The second camera thus collects two-dimensional and/or three-dimensional image data that indicates whether a parcel has been successfully delivered to the second conveyor 30 by the robot singulator 35. Suitable cameras for use in the present invention include three-dimensional image sensors manufactured and distributed by ifM Efector Inc. of Malvern, Pa.

Referring still to FIG. 11, the control subsystem 300 further includes a computer 320 operably connected to the camera(s) 310, such that the computer 320 can receive and process image data from the camera(s) 310. In this regard, the computer 320 includes a processor 330 for executing instructions (routines) stored in a memory component 340 or other computer-readable medium.

Referring still to FIG. 11, the control subsystem 300 further includes a motor control system 350, which receives instructions from the computer 320 and controls operation of certain components of the conveyor system 10, 200 operably connected to the motor control system 350. For example, suitable motor control systems for use in the present invention include: ControlLogix® controllers, which are part of the Allen-Bradley product line manufactured and distributed by Rockwell Automation, Inc. of Milwaukee, Wis.; and PacDrive™ controllers manufactured and distributed by Schneider Electric USA of Andover, Mass. In this exemplary embodiment, the first conveyor 20, the second conveyor 30, the robot singulator 35, and the linear actuator 54, 254 of the rejection mechanism 50, 250 are each operably connected to the motor control system 350.

Referring now to FIGS. 1A, 1B, 7A, 7B, and 11, in some implementations, the conveyor system 10, 200 may commence processing a bulk flow of parcels 12a, 12b, 12c positioned on the first conveyor 20 by having one or more cameras 310 acquire image data identifying the position of a parcel 12a located near the leading edge 20b of the first conveyor 20 intended for transport to the second conveyor 30. Such image data is then transmitted to and processed by the computer 320, which, in turn, communicates instructions to the motor control system 350. Based on the instructions received from the computer 320, the motor control system 350 then communicates instructions (or signals) to the robot singulator 35 (or the motors and/or linear actuators responsible for movement thereof), which cause the robot singulator 35 to move toward, engage, and transport the target parcel 12a to the second conveyor 30, as shown, e.g., by viewing FIGS. 1A and 1B in sequence. One or more cameras 310 may then capture image data which is processed by the computer 320 to verify delivery of the target parcel 12a to the second conveyor 30. Upon such verification, the computer 320 can then communicate instructions to the motor control system 350, which subsequently causes the second conveyor 30 to index forward and clear a path for subsequent parcels intended for delivery to the second conveyor 30.

Following transport of the target parcel 12a off of the first conveyor 20, the computer 320 can communicate instructions to the motor control system 350, which causes the linear actuator 54, 254 of the rejection mechanism 50, 250 to first move the paddle 52, 252 from the first position to the second position to push parcels 12b, 12c located in the rejection zone 20a onto the rejection chute 40, and then return the paddle 52, 252 from the second position to the first (or home) position. In some embodiments, the communication of instructions from the computer 320 to the motor control system 350 causing actuation of the linear actuator 54, 254 of the rejection mechanism 50, 250 may be conditioned upon the computer 320 receiving image data from one or more cameras 310 indicating that one or more parcels 12a, 12b, 12c in the rejection zone 20a exhibits a predefined characteristics (e.g., certain dimensions or shape) that signifies the parcel 12a, 12b, 12c is "unconveyable." Accordingly, in some embodiments, the robot singulator 35 may transport multiple parcels to the second conveyor 30 before the linear actuator 54, 254 of the rejection mechanism 50, 250 is actuated in the manner described above. After the paddle 52, 252 has been returned to the first position, the computer 320 communicates instructions to the motor control system 350 which causes the first conveyor 20 to index forward to move parcels remaining on the first conveyor 20 towards the leading edge 20b of the first conveyor 20. The foregoing process can then be repeated to process the remainder of parcels 12a, 12b, 12c on the first conveyor 20.

Figure 12:
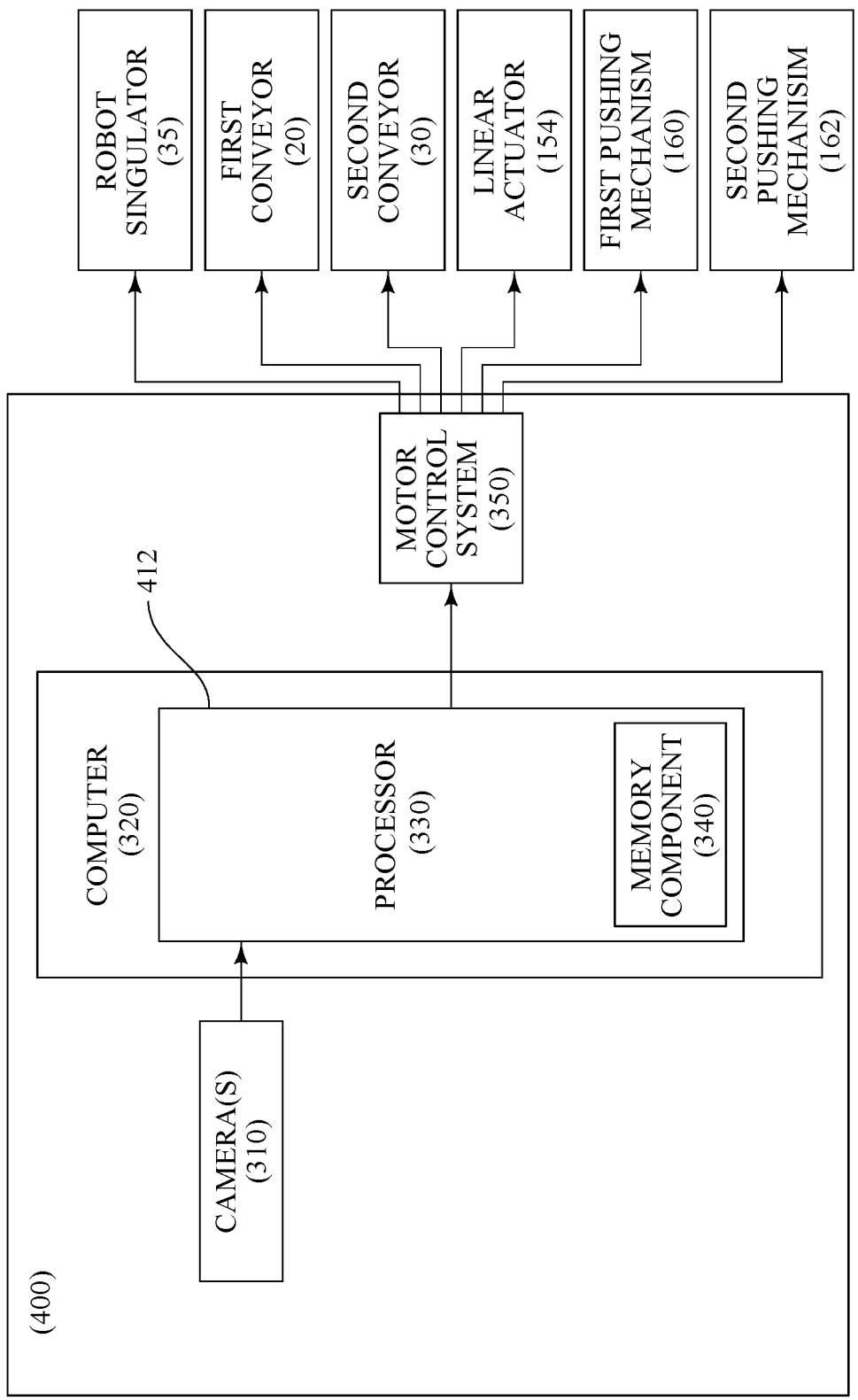
FIG. 12 is a schematic diagram of another control subsystem for a conveyor system that includes a rejection mechanism made in accordance with the present invention.

FIG. 12 is a schematic diagram of another control subsystem 400, which can be utilized with the conveyor system 100 described above with respect to FIGS. 5A and 5B. As shown in FIG. 12, the control subsystem 400 includes each component and functions in the same manner as the control subsystem 300 described above with reference to FIG. 11, except that the motor control system 350 is further operably connected to the first pushing mechanism 160 and the second pushing mechanism 162. Accordingly, the control subsystem 400 can be utilized to process parcels 12a, 12b, 12c in substantially the same manner as the control subsystem 300 described above with reference to FIG. 11. However, in addition to the steps identified in the exemplary implementation above, the computer 320 will also communicate instructions to the motor control system 350 which: (i) causes actuation of the second pushing mechanism 162, after the paddle 152 has reached the second position, to engage the lateral wall portion 152c of the paddle 152 and rotate it from the engaged position to the disengaged position; and (ii) causes actuation of the first pushing mechanism 160, after the paddle 152 has returned to the first position from the second position, to engage the lateral wall portion 152c of the paddle 152 and rotate it from the disengaged position to the engaged position.

Although the exemplary rejection mechanisms 50, 150, 250 are described above as being installed in relation to the first conveyor 20 and second conveyor 30 in the conveyor systems 10, 100, 200, and as working in conjunction with the use of a robot singulator (or robot) 35 for transferring parcels 12a, 12b, 12c from the first conveyor 20 to the second conveyor 30, it should be appreciated that the use of the exemplary rejection mechanisms 50, 150, 250 is not exclusively limited to this application. As noted above, within a sorting facility, there is often a complex system of conveyors and equipment that facilitates transport and sorting of the various parcels within the facility. The exemplary rejection mechanisms 50, 150, 250 described herein could thus be installed and used at other points within the sorting facility; indeed, the exemplary rejection mechanisms 50, 150, 250 could be installed at any location where it is desirable to push or sweep parcels or other objects from a surface.

Furthermore, although the present invention is characterized as a "rejection mechanism," it is not necessarily only for "rejecting" nonconveyables that exceed size and/or weight limitations. Rather, the rejection mechanisms 50, 150, 250 described above could also be used to manipulate parcels for other reasons. For example, each rejection mechanism 50, 150, 250 could be used to "bump" one or more selected parcels and move them toward a more central position on the pick conveyor 20, so that those parcels can be more easily engaged by the robot singulator 35. For another example, each rejection mechanism 50, 150, 250 could be used to engage and spread out a pile of parcels to facilitate viewing and identification of those parcels by the one or more cameras 310 of the control subsystem 300, 400. In short, there are multiple ways that the rejection mechanisms 50, 150, 250 described above could be used to manipulate parcels.

One of ordinary skill in the art will recognize that additional embodiments and implementations are also possible without departing from the teachings of the present invention. This detailed description, and particularly the specific details of the exemplary embodiments and implementations disclosed therein, is given primarily for clarity of understanding, and no unnecessary limitations are to be understood therefrom, for modifications will become obvious to those skilled in the art upon reading this disclosure and may be made without departing from the spirit or scope of the invention.

What is claimed is:

1. A rejection mechanism for a conveyor system including a conveyor for conveying parcels, comprising:
   a linear actuator;
   a paddle mounted to the linear actuator for movement between a first position and a second position, wherein the paddle includes (i) a lower bracket portion for mounting the paddle to the linear actuator, (ii) an upright portion extending upward and adjacent to an edge of the conveyor, and (iii) a lateral wall portion that extends from the upright portion;
   a way cover having a first end fixed in position and a second end mounted to the lateral wall portion of the paddle; and
   wherein, in use, the lateral wall portion is positioned over a portion of an upper surface of the conveyor as the paddle is moved from the first position to the second position, such that parcels positioned on the conveyor in a path of the lateral wall portion are pushed by the lateral wall portion as the paddle is moved from the first position to the second position; and
   wherein the way cover expands and contracts with movement of the paddle.

2. The rejection mechanism as recited in claim 1, wherein the way cover includes multiple stiffeners and a flexible cover positioned over the multiple stiffeners.

3. A conveyor system, comprising:
   a first conveyor for conveying a flow of multiple parcels;
   a rejection chute; and
   a rejection mechanism, including
      a linear actuator, and
      a paddle mounted to the linear actuator for movement between a first position and a second position, wherein the paddle includes (i) a lower bracket portion for mounting the paddle to the linear actuator, (ii) an upright portion extending upward adjacent to an edge of the first conveyor, and (iii) a lateral wall portion that extends from the upright portion;
   wherein, in use, the lateral wall portion of the paddle is positioned over a portion of an upper surface of the first conveyor as the paddle is moved from the first position to the second position, such that parcels positioned on the first conveyor in a path of the lateral wall portion are pushed toward the rejection chute by the lateral wall portion as the paddle is moved from the first position to the second position.

4. The conveyor system as recited in claim 3, and further comprising:
   a robot singulator configured to engage and transfer individual parcels in the flow of multiple parcels from the first conveyor to a second conveyor.

5. The conveyor system as recited in claim 4, wherein the upright portion of the paddle extends upward through a gap between the first conveyor and the second conveyor.

6. The conveyor system as recited in claim 4, wherein the rejection mechanism further includes a way cover having a first end fixed in position and a second end mounted to the lateral wall portion of the paddle.

7. The conveyor system as recited in claim 4, wherein the lateral wall portion of the paddle is configured to transition between (i) an engaged position, in which the lateral wall portion of the paddle is in a substantially horizontal orientation for pushing parcels, and (ii) a disengaged position, in which the lateral wall portion of the paddle is in a substantially vertical orientation.

8. The conveyor system as recited in claim 7, wherein the upright portion of the paddle includes an upper section and a lower section connected by a hinge, such that the lateral wall portion of the paddle rotates about an axis of rotation defined by the hinge between the engaged position and the disengaged position.

9. The conveyor system as recited in claim 8, wherein the rejection mechanism further includes:
   a first pushing mechanism configured to engage and cause the lateral wall portion of the paddle to rotate about the axis of rotation defined by the hinge from the disengaged position to the engaged position when the paddle is in the first position; and
   a second pushing mechanism configured to engage and cause the lateral wall portion of the paddle to rotate about the axis of rotation defined by the hinge from the engaged position to the disengaged position when the paddle is in the second position.

10. The conveyor system as recited in claim 7, wherein the upright portion of the paddle is operably connected to the lateral wall portion of the paddle by a hinge, such that the lateral wall portion of the paddle can rotate about an axis of rotation defined by the hinge between the engaged position and the disengaged position, and wherein the rejection mechanism further includes:
   a first linkage mounted for sliding movement in a channel defined by a guide mounted to a surface of the upright portion of the paddle, wherein the first linkage is operably connected to the lateral wall portion of the paddle;
   a cam follower mounted to and extending from the first linkage; and
   a track receiving the cam follower;
   wherein interaction of the cam follower with the track causes the lateral wall portion of the paddle to rotate about the axis of rotation defined by the hinge between the engaged position and the disengaged position.

11. The conveyor system as recited in claim 10, wherein the rejection mechanism further includes:
   a second linkage, wherein a distal end of the first linkage is pivotally connected to a proximal end of the second linkage, and a distal end of the second linkage is pivotally connected to the lateral wall portion of the paddle.

12. The conveyor system as recited in claim 10, wherein the track includes a first inclined ramp and a second inclined ramp;
   wherein movement of the cam follower along the first inclined ramp causes the lateral wall portion of the paddle to transition from the engaged position to the disengaged position; and
   wherein movement of the cam follower along the second inclined ramp causes the lateral wall portion of the paddle to transition from the disengaged position to the engaged position.

* * * * *